(12) United States Patent
Sato et al.

(10) Patent No.: US 7,597,997 B2
(45) Date of Patent: Oct. 6, 2009

(54) NONAQUEOUS ELECTROLYTE SECONDARY BATTERY AND METHOD FOR PRODUCING SAME

(75) Inventors: Toshitada Sato, Osaka (JP); Harunari Shimamura, Moriguchi (JP); Hideaki Ohyama, Chigasaki (JP); Yasuhiko Bito, Minamikawachi-gun (JP)

(73) Assignee: Panasonic Corporation, Osaka (JP)

( * ) Notice: Subject to any disclaimer, the term of this patent is extended or adjusted under 35 U.S.C. 154(b) by 683 days.

(21) Appl. No.: 10/545,760

(22) PCT Filed: May 21, 2004

(86) PCT No.: PCT/JP2004/007294

§ 371 (c)(1),
(2), (4) Date: Aug. 15, 2005

(87) PCT Pub. No.: WO2004/105152

PCT Pub. Date: Dec. 2, 2004

(65) Prior Publication Data

US 2006/0147800 A1    Jul. 6, 2006

(30) Foreign Application Priority Data

May 22, 2003    (JP)    ............... 2003-145346

(51) Int. Cl.
*H01M 4/00* (2006.01)
*H01M 4/56* (2006.01)
*H01M 4/58* (2006.01)

(52) U.S. Cl. ............... 429/220; 429/225; 429/221; 429/223; 429/231.95; 29/623.5

(58) Field of Classification Search ............ 429/231.95, 429/218.1, 225, 231.5, 232, 245; 29/623.5
See application file for complete search history.

(56) References Cited

U.S. PATENT DOCUMENTS

| 6,265,111 | B1 | 7/2001 | Bito et al. |
| 6,808,846 | B2 | 10/2004 | Hashimoto et al. |
| 2002/0160265 | A1 | 10/2002 | Hashimoto et al. |
| 2003/0039891 | A1 | 2/2003 | Nitta et al. |

(Continued)

FOREIGN PATENT DOCUMENTS

EP    1335438    8/2003

(Continued)

*Primary Examiner*—Patrick Ryan
*Assistant Examiner*—Thomas H. Parsons
(74) *Attorney, Agent, or Firm*—Hamre, Schumann, Mueller & Larson, P.C.

(57) ABSTRACT

A nonaqueous electrolyte secondary battery with excellent charging/discharging cycle characteristics is provided, more specifically a nonaqueous electrolyte secondary battery in which deterioration of the conductivity of a negative electrode due to charging/discharging cycle is suppressed and a method for manufacturing the same are provided. The nonaqueous electrolyte secondary battery includes: a positive electrode and a negative electrode that are capable of reversibly absorbing and desorbing Li ions; and a nonaqueous electrolyte having lithium ion conductivity. The negative electrode includes a collector and active material particles that are disposed on a surface of the collector. The active material particles include Si and at least one element R selected from the group consisting of Sn, In, Ga, Pb and Bi. Metallic bond including the element R is formed between the active material particles.

24 Claims, 5 Drawing Sheets

U.S. PATENT DOCUMENTS

2004/0043294 A1 3/2004 Fukui et al.

FOREIGN PATENT DOCUMENTS

| JP | 2001-256974 | 9/2001 |
| JP | 2002-124254 | 4/2002 |
| JP | 2002-216746 | 8/2002 |
| JP | 2002-260637 | 9/2002 |
| JP | 2004-22306 | 1/2004 |
| JP | 2004-139954 | 5/2004 |
| WO | WO 00/24070 A1 | 4/2000 |
| WO | WO 02/21616 A1 | 3/2002 | though *US 7,597,997 B2*

NONAQUEOUS ELECTROLYTE SECONDARY BATTERY AND METHOD FOR PRODUCING SAME

TECHNICAL FIELD

The present invention relates to a nonaqueous electrolyte secondary battery and a method for manufacturing the same.

BACKGROUND ART

In recent years, alloy-based negative electrode materials containing elements such as Si (silicon) and Sn (tin) have received attention as negative electrode active materials for nonaqueous electrolyte secondary batteries. Some kinds of metal elements including Si, Sn and the like are capable of absorbing and desorbing Li (lithium) reversibly and electrochemically. Further, as compared with conventional carbon-based materials such as graphite that are generally used as negative electrode active materials, these metal elements have a possibility of increasing a negative electrode capacity. For instance, the theoretical discharging capacity of Si is about 4,199 mAh/g, which is about 11 times the theoretical discharging capacity of graphite.

These alloy-based negative electrode materials, however, tend to expand significantly because the crystal structure of these materials varies because an alloy such as Li—Si or Li—Sn is formed when absorbing Li. In the case where graphite is used as a negative electrode active material, since Li is inserted between layers of graphite (intercalation reaction), the volume expands by about 1.1 times during the Li-absorption. On the other hand, in the case where Si absorbs Li to the maximum extent, the volume is increased by about 4 times theoretically, compared with that prior to the absorption. When a negative electrode active material expands significantly along with the absorption of Li, active material particles may break or an active material layer peels off from a collector, which causes deterioration of the conductivity of the negative electrode. Such a deterioration of the conductivity of the negative electrode leads to deterioration of the battery characteristics such as charging/discharging cycle characteristics.

For instance, as one possible countermeasure for suppressing the peeling-off of an active material layer, the ratio of a binder included in the active material layer may be increased. However, since the binder itself does not contribute to the charging/discharging reaction, the negative electrode capacity thereof may be degraded.

Furthermore, in order to suppress the deterioration of the conductivity of a negative electrode, JP 2002-260637 A for example proposes a negative electrode obtained by sintering in a non-oxidizing atmosphere a mixture of active material particles containing Si and conductive metal powders made of copper or copper alloy on a surface of a collector made of copper foil or copper-alloy foil.

In the negative electrode disclosed by JP 2002-260637 A, however, a Cu—Si compound that does not react with Li electrochemically is produced by the sintering process during the manufacturing, which may degrade the negative electrode capacity. Also, the technology disclosed in the above publication necessarily requires the sintering at a high temperature, where copper (Cu) used as the collector may melt or harden. Such a phenomenon results in the loss of flexibility as the collector, which might make it difficult to configure a battery.

DISCLOSURE OF INVENTION

In view of such circumstances, it is an object of the present invention to provide a nonaqueous electrolyte secondary battery with excellent charging/discharging cycle characteristics, more specifically a nonaqueous electrolyte secondary battery in which deterioration of the conductivity of a negative electrode due to charging/discharging cycle is suppressed and to provide a method for manufacturing the same.

A nonaqueous electrolyte secondary battery of the present invention may include: a positive electrode and a negative electrode that are capable of reversibly absorbing and desorbing Li ions; and a nonaqueous electrolyte having lithium ion conductivity. The negative electrode may include a collector and active material particles that are disposed on a surface of the collector. The active material particles may include Si and at least one element R selected from the group consisting of Sn, In, Ga, Pb and Bi. Metallic bond including the element R may be formed between the active material particles.

Another nonaqueous electrolyte secondary battery of the present invention may include: a positive electrode and a negative electrode that are capable of reversibly absorbing and desorbing Li ions; and a nonaqueous electrolyte having lithium ion conductivity. The negative electrode may include a collector and active material particles that are disposed on a surface of the collector. The collector may include Cu with a content of 95% or more. The active material particles may include Si and at least one element R selected from the group consisting of Sn, In, Ga, Pb and Bi. Metallic bond including the element R may be formed between a part of the active material particles and the collector.

Next, a method for manufacturing a nonaqueous electrolyte secondary battery of the present invention is for manufacturing a nonaqueous electrolyte secondary battery including: a positive electrode and a negative electrode that are capable of reversibly absorbing and desorbing Li ions; and a nonaqueous electrolyte having lithium ion conductivity. The method may include the steps of:

(i) forming a first sheet by applying a slurry to a surface of a collector including Cu with a content of 95 mass % or more, followed by drying, the slurry including active material particles including Si and at least one element R selected from the group consisting of Sn, In, Ga, Pb and Bi; and (ii) forming the negative electrode by heat-treating the first sheet at a temperature ranging from 80° C. to 350° C. in a non-oxidizing atmosphere.

Another method for manufacturing a nonaqueous electrolyte secondary battery of the present invention is for manufacturing a nonaqueous electrolyte secondary battery: including a positive electrode and a negative electrode that are capable of reversibly absorbing and desorbing Li ions; and a nonaqueous electrolyte having lithium ion conductivity. The method may include the steps of:

(I) forming a first sheet by applying a slurry including active material particles including Si to a surface of a collector including Cu with a content of 95 mass % or more, followed by drying;

(II) forming a second sheet by forming a film including at least one element R selected from the group consisting of Sn, In, Ga, Pb and Bi on surfaces of the active material particles; and (III) forming the negative electrode by heat-treating the second sheet at a temperature ranging from 80° C. to 350° C. in a non-oxidizing atmosphere.

Still another method for manufacturing a nonaqueous electrolyte secondary battery of the present invention is for manufacturing a nonaqueous electrolyte secondary battery including: a positive electrode and a negative electrode that are capable of reversibly absorbing and desorbing Li ions; and a nonaqueous electrolyte having lithium ion conductivity. The method may include the steps of:

(a) forming a first sheet by applying a slurry to a surface of a collector, followed by drying, the slurry including: active material particles including Si and at least one element R selected from the group consisting of Sn, In, Ga, Pb and Bi; and a conductive agent including Cu; and (b) forming the negative electrode by heat-treating the first sheet at a temperature ranging from 80° C. to 350° C. in a non-oxidizing atmosphere.

A further method for manufacturing a nonaqueous electrolyte secondary battery of the present invention is for manufacturing a nonaqueous electrolyte secondary battery including: a positive electrode and a negative electrode that are capable of reversibly absorbing and desorbing Li ions; and a nonaqueous electrolyte having lithium ion conductivity. The method may include the steps of:

(A) forming a first sheet by applying a slurry to a surface of a collector, followed by drying, the slurry including: active material particles including Si; and a conductive agent including Cu;

(B) forming a second sheet by forming a film including at least one element R selected from the group consisting of Sn, In, Ga, Pb and Bi on surfaces of the active material particles and the conductive agent; and (C) forming the negative electrode by heat-treating the second sheet at a temperature ranging from 80° C. to 350° C. in a non-oxidizing atmosphere.

A still further method for manufacturing a nonaqueous electrolyte secondary battery of the present invention is for manufacturing a nonaqueous electrolyte secondary battery including: a positive electrode and a negative electrode that are capable of reversibly absorbing and desorbing Li ions; and a nonaqueous electrolyte having lithium ion conductivity. The method may include the steps of:

(α) forming a first sheet by applying a slurry to a surface of a collector, followed by drying, the slurry including: active material particles including Si; and an additive including at least one element R selected from the group consisting of Sn, In, Ga, Pb and Bi; and (β) forming the negative electrode by heat-treating the first sheet at a temperature ranging from 80° C. to 350° C. in a non-oxidizing atmosphere.

DESCRIPTION OF THE INVENTION

Figure 1:
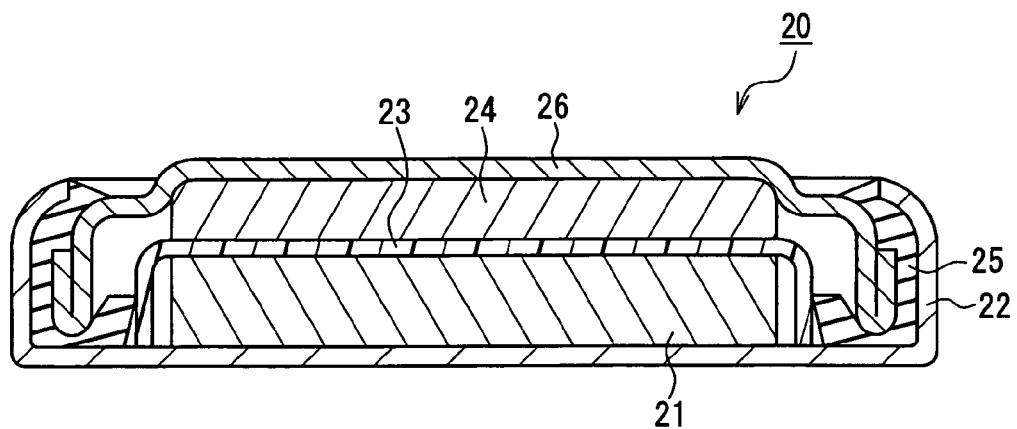
FIG. 1 schematically shows one example of a nonaqueous electrolyte secondary battery of the present invention.

The following describes embodiments of the present invention, with reference to the drawings. In the following description of embodiments, the same reference numerals may be assigned to the same elements in order to avoid the duplication of explanations.

Firstly, a nonaqueous electrolyte secondary battery (hereinafter also referred to as "secondary battery" or "battery" simply) of the present invention will be described below.

A secondary battery of the present invention includes: a positive electrode and a negative electrode that are capable of absorbing and desorbing lithium ions reversibly; and a nonaqueous electrolyte having lithium ion conductivity, and a feature thereof resides in the negative electrode. Herein, to absorb and desorb lithium ions refers to the electrochemical absorbing and desorbing of lithium ions, which is not intended to limit the form of absorbed and desorbed lithium ions. In general, $Li^+$ is absorbed and desorbed. In this specification, "capability of absorbing and desorbing lithium ions reversibly" may be described simply as "capability of absorbing and desorbing lithium reversibly" and "having lithium ion conductivity" may be simply described as "having lithium conductivity".

More specifically, the secondary battery of the present invention includes, for example, a case and an electrode plate group and a nonaqueous electrolyte that are accommodated in the case. The electrode plate group includes a positive electrode, a negative electrode and a separator disposed between the positive electrode and the negative electrode. The positive electrode and the negative electrode both are capable of absorbing and desorbing lithium reversibly.

Members generally used for nonaqueous electrolyte secondary batteries can be applied to elements other than the negative electrode. For instance, the positive electrode used may include a positive electrode active material made of transition metal complex oxide containing lithium. The complex oxide is not limited particularly, and, above all, complex oxides such as $LiCoO_2$, $LiNiO_2$ and $LiMn_2O_4$ and compounds in which metal elements of types different from the transition metals in these complex oxides (e.g., Co, Ni, Mn, Al, Mg, Zr and the like) are dissolved in a solid state are used preferably. As long as a positive electrode active material capable of absorbing and desorbing lithium reversibly is included, the configuration and the shape of the positive electrode are not limited particularly.

Regarding the separator, the configuration, the shape and materials used are not limited particularly, as long as it is stable electrochemically in the internal environment of the battery, it can hold the nonaqueous electrolyte and can prevent the electrical shorting between the positive electrode and the negative electrode. For instance, porous membrane, nonwoven fabric, woven fabric and the like made of olefin resins such as polyethylene and polypropylene can be used.

Regarding the nonaqueous electrolyte, the materials used are not limited particularly as long as they have lithium ion conductivity. Solid nonaqueous electrolyte or liquid nonaqueous electrolyte (i.e., a nonaqueous electrolyte solution) may be used. As the nonaqueous electrolyte solution, a solution including lithium salt dissolved in a nonaqueous solvent may be used, for example. For instance, $LiPF_6$, $LiBF_4$, $LiClO_4$, $LiN(CF_3SO_2)_2$ and the like may be used for the lithium salt. The nonaqueous solvent can be, for example, cyclic carbonate compounds such as ethylene carbonate, propylene carbonate and vinylene carbonate, open-chain carbonate compounds such as dimethyl carbonate, diethyl carbonate and ethyl methyl carbonate and butyrolactone compounds such as γ-butyrolactone. A nonaqueous solvent including these compounds mixed in an arbitrary ratio also can be used.

The shape of the secondary battery also is not limited particularly. The secondary battery of the present invention may be a flat-shaped secondary battery 20 as shown in FIG. 1 (nonaqueous electrolyte secondary battery 20). In the secondary battery 20 of FIG. 1, a positive electrode 21, a negative electrode 24 and a separator 23 sandwiched between the positive electrode 21 and the negative electrode 24 are accommodated in a case 22 doubling as a positive electrode terminal. A nonaqueous electrolyte also is accommodated inside the case 22, which is not illustrated. The case 22 is sealed with a gasket 25 and a sealing plate 26 doubling as a negative electrode terminal. Alternatively, the secondary battery of the present invention may be a cylindrical-shaped secondary battery including the laminate of a positive electrode, a separator and a negative electrode laminated in this stated order, which is then wound to be a cylindrical-shaped electrode plate group.

The secondary battery of the present invention is applicable from small-size secondary batteries used for precision equipment and mobile equipment to large-size secondary batteries used for hybrid cars, irrespective of sizes and uses.

The following describes a negative electrode in the secondary battery of the present invention.

Figure 2:
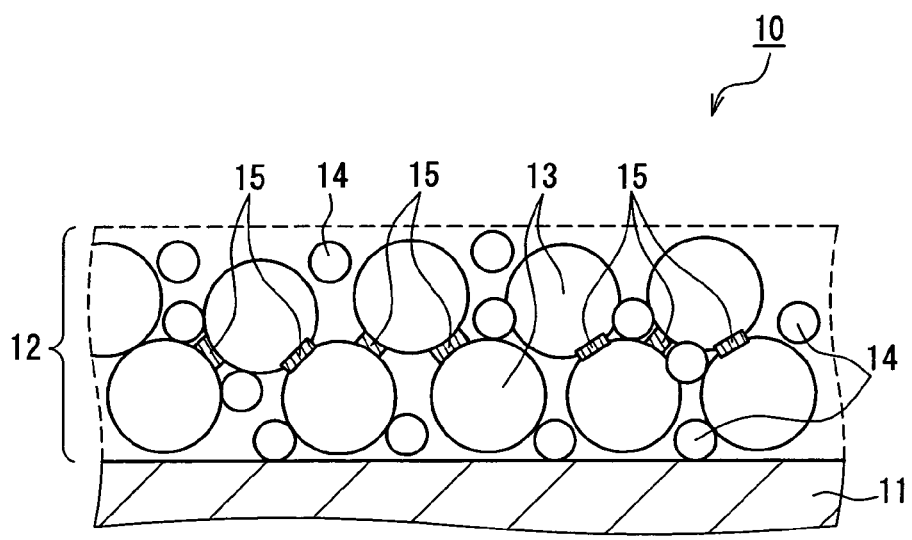
FIG. 2 schematically shows one example of the configuration of a negative electrode in a nonaqueous electrolyte secondary battery of the present invention.

FIG. 2 shows one example of the configuration of a negative electrode in the secondary battery of the present invention. The negative electrode 10 of FIG. 2 includes a collector 11 and active material particles 13 disposed on a surface of the collector 11. On the surface of the collector 11, a conductive agent 14 is disposed as well as the active material particles 13 so that the active material particles 13 and the conductive agent 14 form an active material layer 12. In other words, the active material layer 12 including the active material particles 13 and the conductive agent 14 is formed on the surface of the collector 11. Note here that the conductive agent 14 may be omitted, which may be included in the active material layer 12 as needed. The active material particles 13 include: at least one element R selected from Sn (tin), In (indium), Ga (gallium), Pb (lead) and Bi (bismuth); and Si (silicon). Metallic bond (a metallic bond part 15) including the element R is formed between the active material particles 13. In other words, the active material particles 13 are bonded together through the metallic bond via the element R. Alternatively, it can be said that the active material particles 13 are bonded together by an alloy containing the element R. Herein, the concept of an alloy in this specification includes a solid solution and an intermetallic compound as well as a general alloy. In FIG. 2, for the simplicity of the description, hatching of the active material particles 13 and the conductive agent 14 is omitted, and similarly hatching is omitted in the subsequent drawings in some cases.

The element R is capable of absorbing and desorbing lithium reversibly in the form of a single element. For that reason, although the active material particles 13 contain the element R in addition to Si in the negative electrode in the secondary battery of the present invention, a significant decrease in capacity of the active material particles 13 themselves can be suppressed. Further, the element R tends to form an alloy with other elements, especially a transition metal element, at a relatively low temperature (e.g., in the range from 100° C. to 350° C.). Moreover, the thus formed alloy has a property of being less reactive with lithium electrochemically (hard to absorb and desorb lithium). Therefore, at the metallic bond part 15 of the negative electrode 10, the absorbing and desorbing of lithium ions are suppressed during the charging and discharging of the battery, and accordingly the expanding and contracting of the metallic bond part 15 can be suppressed. That is, the negative electrode 10 in the secondary battery 20 of the present invention allows the active material particles 13 to be bonded together more firmly than a conventional one. Thus, even when Si contained in the active material particles 13 expands and contracts along with the charging and discharging of the battery (along with the absorbing and desorbing of lithium), phenomena of the active material particles 13 desorbing from the active material layer 12 and of breaking in the active material layer 12 can be suppressed. That is, a secondary battery with excellent charging and discharging cycle characteristics can be provided, more specifically a secondary battery can be provided, in which deterioration of the conductivity of the negative electrode due to the charging/discharging cycle can be suppressed, for example. Such a secondary battery can be obtained by a secondary battery manufacturing method of the present invention described later, for example.

The size of the active material particles 13 is not limited particularly, and the average particle diameter ranges from 0.1 μm to 45 μm, for example, and preferably from 1 μm to 25 μm. In the case of the average particle diameter of the active material particles 13 being not less than 0.1 μm, for example, an increase in contact resistance between the active material particles can be suppressed. In the case of the average particle diameter of the active material particles 13 being not more than 45 μm, an increase in roughness of the surface of the active material layer 12, i.e., of the surface of the negative electrode 10 can be suppressed.

The ratio of the active material particles 13 contained in the active material layer 12 is not limited particularly, which can be set freely depending on required properties of the battery.

In the secondary battery of the present invention, the active material particles 13 further may contain a transition metal element M (hereinafter also referred to as "element M" simply). Such a secondary battery can suppress the breaking of the active material particles 13 themselves due to the absorbing and desorbing of lithium.

In order to suppress the breaking of the active material particles 13 due to the absorbing and desorbing of lithium, it is effective to use very fine crystallites of Si, which are then dispersed into a material that is hard to absorb and desorb lithium and is rich in electronic conductivity (conductivity). As such an active material, an active material having a phase of an intermetallic compound of Si and the element M and a Si single phase is available. The intermetallic compound of Si and the element M is excellent in electronic conductivity compared with the Si single phase and has a property of being less reactive with lithium electrochemically. Therefore, when the active material particles 13 further contain the element M, the breaking of the active material particles 13 themselves due to the absorbing and desorbing of lithium can be suppressed.

The content of the element R contained in the active material particles 13 is not limited particularly. Above all, the range from 2 mass parts to 25 mass parts, inclusive, is preferable relative to the total 100 mass parts of Si contained in the active material particles 13 (in the case where the active material particles 13 further contain the element M, relative to the total 100 mass parts of Si and the element M). When the content of the element R is less than 2 mass %, the metallic bond 15 cannot be formed sufficiently, which might degrade the above-stated effects. When the content of the element R is more than 25 mass %, the ratio of the presence of single element R may increase. Since the element R alone is capable of absorbing and desorbing lithium reversibly, if the ratio of the presence of the single element R increase, the element R will expand and contract, which may cause the breaking of the active material particles 13 or the destruction of the metallic bond 15.

The element M is not limited particularly as long as it is an element capable of forming an intermetallic compound with Si. Above all, at least one element selected from Ti, V, Mn, Fe, Co, Ni, Cu, Zr, Nb, Mo and W is used preferably, and Ti is particularly preferable. For instance, when Ti and Si are allowed to be an alloy, the active material particles 13 can be obtained having a high electronic conductivity and having at least two phases, including a phase of a Ti—Si intermetallic compound that is less reactive with lithium electrochemically and a Si single phase.

Figure 3:
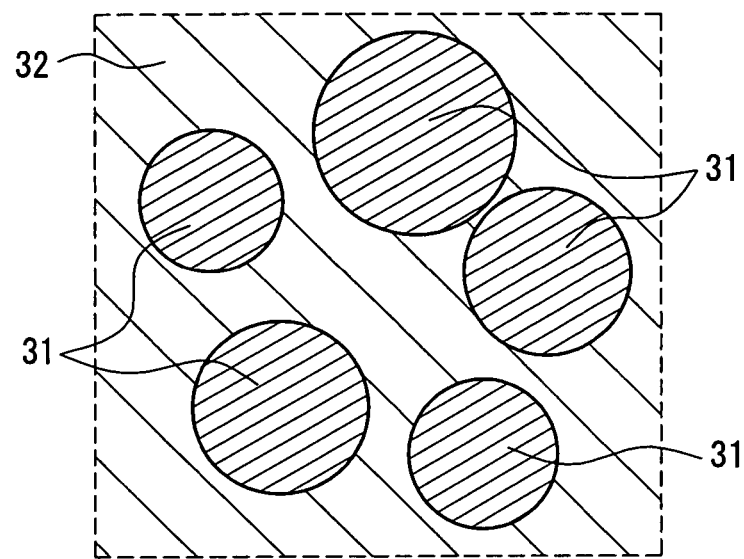
FIG. 3 schematically shows one example of the configuration of active material particles in a negative electrode of a nonaqueous electrolyte secondary battery of the present invention.

In the secondary battery of the present invention, the active material particles 13 preferably include: a first phase made of an intermetallic compound represented by a chemical composition formula of $MSi_2$; and a second phase made of amorphous Si. This can further suppress the breaking of the active material particles 13 due to the absorbing and desorbing of lithium. FIG. 3 shows one example of the configuration of such active material particles. In the example of FIG. 3, the Si phase 31 made of amorphous Si is distributed like islands in the $MSi_2$ phase 32 made of the intermetallic compound represented by the composition formula of $MSi_2$, where a sea-island structure is formed including sea (matrix) of the $MSi_2$ phase 32 and islands of the Si phase 31. Herein, "M" in the composition formula $MSi_2$ refers to the above-described element M.

The intermetallic compound represented by the composition formula of $MSi_2$ (it can be called a silicide of the element M as well) is not limited particularly, and it may be an intermetallic compound of the above-described examples for the element M and Si, for example. Above all, $TiSi_2$ including Ti as the element M is preferable, because it has a higher electronic conductivity than a silicide of an element M other than Ti and the formation thereof is easy.

Herein, the amorphous Si refers to Si with a broad scattering band existing in a diffraction profile, in which an apex is in the range of 20° to 40° represented with a 2θ value obtained by X-ray diffraction determination using CuKα radiation, for example. The diffraction profile of the amorphous Si may include crystalline diffraction lines existing therein. In the case of including crystalline diffraction lines, however, it is preferable that the half-width of the peak where the most intensive diffraction intensity appears for the 2θ value be 0.6° or more. Unlike a Si phase made of crystalline Si, the Si phase made of such amorphous Si has a disordered crystal structure or a chaos amorphous structure. Therefore, the structure is hardly changed, even when it absorbs lithium (as described above, in the case of crystalline Si, the crystal structure thereof changes when it absorbs lithium, thus exhibiting remarkably an expanding phenomenon), and therefore it is less prone to destruction. Further, in general, amorphous Si is higher in strength than crystalline Si, and therefore it can suppress more the occurrence of breaking in the active material particles 13 due to absorbing and desorbing of lithium.

It is preferable that the average diameter of crystallites in the first phase ($MSi_2$ phase 32, such as $TiSi_2$ phase) be not more than 50 nm (e.g., the range from 1 nm to 40 nm). When the average diameter of crystallites in the $MSi_2$ phase is larger than 50 nm, there is a possibility that the active material particles 13 break due to the Si phase that expands during charging (during absorbing of lithium). The breaking in the active material particles 13 becomes a factor in degrading the conductivity of the negative electrode.

It is preferable that the average diameter of crystallites in the second phase (amorphous Si phase 31) be not more than 50 nm (e.g., the range from 1 nm to 40 nm). Above all, 30 nm or less is preferable and 10 nm or less is particularly preferable. When the average diameter of crystallites in the Si phase is larger than 50 nm, there is a possibility that the probability of breaking of the active material particles 13 increases because of the expanding and contracting inside the active material particles 13.

In the case where the element M is Ti, it is preferable that the mass ratio of Si relative to Ti contained in the active material particles 13 (mass of Si/mass of Ti) be not less than 1.18. In order to allow the formation of active material particles including two phases of a $TiSi_2$ phase and a Si phase, it is preferable that the composition be richer in Si than $TiSi_2$ (Ti 46 wt %-Si 54 wt %, that is, the mass ratio Si/Ti=1.17). Above all, in terms of a negative electrode capacity and charging/discharging cycle characteristics, active material particles containing Ti and Si with a mass ratio ranging from Ti 40 wt %-Si 60 wt % (i.e., the mass ratio Si/Ti=1.50) to Ti 35 wt %-Si 65 wt % (i.e., the mass ratio Si/Ti=1.86) are preferable.

In the secondary battery of the present invention, it is preferable that the oxygen content of the active material particles 13 be not more than 2 mass % at the time before configuring the battery. When the oxygen content is larger than 2 mass %, insulative $SiO_2$ or transition metal oxides would be produced on the surface or inside the active material particles 13, thus degrading electronic conductivity in the particles. Also, when Si, which absorbs and desorbs lithium, turns into an oxide, there is a possibility of deterioration of the negative electrode capacity. The oxygen content of the active material particles 13 can be decreased by treating the active material particles 13 with hydrofluoric acid or the like. As another way to decrease the oxygen content, the average particle diameter of the active material particles 13 may be restricted so as to exclude particles with extremely minute average particle diameters.

The composition, the structure and the shape of the metallic bond part 15 are not limited particularly as long as metallic bond can be formed including the element R. For instance, the metallic bond part 15 may include an alloy of a transition metal element and the element R. In other words, a region between the active material particles 13 where the metallic bond is formed may include a transition metal element and the element R. As the transition metal element, Cu is preferable. That is, the metallic bond part 15 may include a solid solution of the element R and Cu. In other words, a region between the active material particles 13 where the metallic bond is formed may include Cu and the element R. Since the solid solution of Cu and the element R hardly shows electrochemical reactivity with lithium, this can prevent the metallic bond part 15 from expanding and contracting even at the time of charging and discharging. The solid solution of Cu and the element R is not a limited example, and it is preferable that the metallic bond part 15 hardly show electrochemical reactivity with lithium. In other words, it is preferable that a region between the active material particles 13 where metallic bond is formed show non-reactivity with lithium.

The metallic bond part 15 including an alloy of a transition metal element and the element R, such as the solid solution of Cu and the element R, can be formed for example by a method for manufacturing a secondary battery of the present invention described later. At this time, the transition metal element, e.g., Cu can be supplied from a collector or a conductive agent existing in an active material layer, for example.

Note here that there is no need to form the metallic bond part 15 between all of the active material particles 13. Instead, this may be formed between at least a part of the active material particles 13.

Assuming that the particle diameter of an active material particle 13 is D, 80 atomic % or more of the element R (preferably 90 atomic % or more) preferably exists in the range from the surface of the active material particle 13 to the depth of 0.1D. When the element R exists in the vicinity of the surfaces of the active material particles during the manufacturing of the negative electrode 10, Cu in the collector or in the conductive agent easily can react with the element R, thus facilitating the formation of the solid solution of Cu and the element R between the active material particles. As a possible method to obtain such active material particles 13, the element R may be attached to the surfaces of the active material particles containing Si, for example. More specifically, the element R may be attached to the surfaces of the active material particles containing Si by plating, sputtering, vacuum evaporation, a CVD method and a mechanical milling process, for example. Among them, plating is used preferably because it enables a treatment at a low temperature.

The material used for the collector 11 is not limited particularly as long as it does not cause a change in quality inside the secondary battery such as dissolution at a possible potential of the negative electrode 10, and has excellent conductivity. For instance, Cu and a Cu alloy may be used for this purpose. Above all, the collector 11 with a Cu-content of 95 mass % or more is used preferably. When the collector 11 with a Cu-content of 95 mass % or more is used, the metallic bond part 15 can be formed more easily so as to include a solid solution of the element R and Cu at the time of manufacturing of the negative electrode 10. Also, the conductivity of the collector 11 itself becomes excellent.

The shape of the collector 11 is not limited particularly, and the collector 11 may have at least one shape selected from a foil member, a porous member and a foam member. In the case of using a foil-form collector 11, it is preferable that the surface roughness be large to some extent (e.g., in terms of the center line average roughness Ra specified by JIS B 0601-1994, 0.2 µm or more), and for example a collector 11 with protrusions shaped like a spike or the like formed on the surface may be used. Such a collector 11 enables the enhancement of the adhesion between the active material layer 12 and the collector 11, thus suppressing peeling-off of the active material layer 12 at the time of charging and discharging. Further, as described later, in the case where a metallic bond part is formed between the collector 11 and a part of the active material particles 13, a three-dimensional metallic bond part can be formed between the active material particles 13 and the collector 11, thus suppressing peeling-off of the active material layer 12 at the time of charging and discharging.

The thickness of the collector 11 is not limited particularly, and for example the range from 1 µm to 20 µm, more specifically the range from 5 µm to 12 µm, is preferable. The use of a thin collector 11 can increase the amount of active material per unit volume of the battery. Herein, in the case where the collector 11 is a porous member or a foam member, the active material particles 13 may be disposed to the internal surfaces of pores formed in the collector 11.

The conductive agent 14 has a function of ensuring the conductivity of the active material layer 12. Therefore, the material used for the conductive agent 14 is not limited particularly as long as the material has excellent conductivity. For instance, the conductive agent 14 may contain a transition metal element L (hereinafter also referred to as "element L" simply). This can compensate for the electronic conductivity of Si contained in the active material particles 13, and above all the effect can be realized during high rate discharge of the battery. Further, the element R contained in the active material particles 13 and the element L can form an alloy at a relatively low temperature (e.g., 350° C. or less). When an alloy is formed between the active material particles 13 and the conductive agent 14, the contact resistance between the active material particles 13 and the conductive agent 14 can be reduced, thus enhancing the battery characteristics. Further, at the time of manufacturing the negative electrode 10, the metallic bond part 15 including an alloy of the transition metal element and the element R can be formed easily.

The specific kind of the element L is not limited particularly. Above all, Cu is used preferably as the element L. Since Cu has a high bonding property with the element R, an alloy can be formed more easily between the active material particles 13 and the conductive agent 14. Further, when the conductive agent 14 contains Cu, the metallic bond part 15 can be formed more easily at the time of manufacturing the negative electrode 10 so as to include a solid solution of Cu and the element R.

The active material layer 12 may contain an arbitrary material, as needed, in addition to the active material particles 13 and the conductive agent 14. For instance, the active material layer 12 may contain a binder. The type of the binder is not limited particularly, and a binder generally used for nonaqueous electrolyte secondary batteries may be used.

The thickness of the active material layer 12 is not limited particularly. Although FIG. 2 illustrates an example where the active material layer 12 is disposed on one surface (one principal plane) of the collector 11 only, the active material layers 12 may be disposed on both surfaces (both principal planes) of the collector 11.

Figure 4:
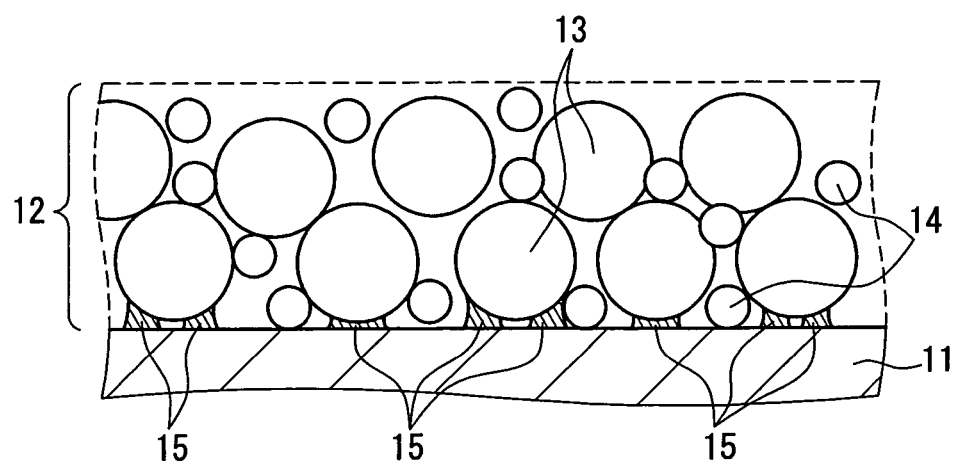
FIG. 4 schematically shows another example of a nonaqueous electrolyte secondary battery of the present invention.

FIG. 4 shows another example of the configuration of a negative electrode in the secondary battery of the present invention. As shown in FIG. 4, in the negative electrode 10 of the secondary battery of the present invention, metallic bond (or metallic bond parts 15) containing the element R may be formed between a part of the active material particles 13 and the collector 11. In other words, a part of the active material particles 13 and the collector 11 are coupled via the element R by the metallic bond. Alternatively, a part of the active material particles 13 and the collector 11 may be coupled by an alloy containing the element R.

As previously described, the metallic bond part 15 in the negative electrode 10 can suppress absorption and desorption of lithium at the time of charging and discharging of the battery, and accordingly the expanding and contracting of the metallic bond part 15 can be suppressed. That is, in the negative electrode 10 of FIG. 4, the active material particles 13 and the collector 11 (i.e., the active material layer 12 and the collector 11) can be coupled more firmly than in a conventional one. Therefore, even in the case where Si contained in the active material particles 13 expands and contracts due to the charging and discharging of the battery (due to the absorption and desorption of lithium), a phenomenon such as the active material particles 13 (the active material layer 12) peeling off from the surface of the collector 11 can be suppressed. Additionally, the electronic conductivity between the active material layer 12 and the collector 11 can be maintained more favorably. That is, a secondary battery with excellent charging/discharging cycle characteristics, more specifically, a secondary battery in which deterioration of the conductivity of the negative electrode due to charging/discharging cycle is suppressed can be realized. Herein, in order that the metallic bond parts 15 are formed between the active material particles 13 and the collector 11 in the negative electrode of FIG. 4, the collector 11 preferably contains Cu with a content of 95 mass % or more. This can facilitate the formation of the metallic bond parts 15 so as to contain the element R and Cu at the time of manufacturing the negative electrode 10.

Figure 5:
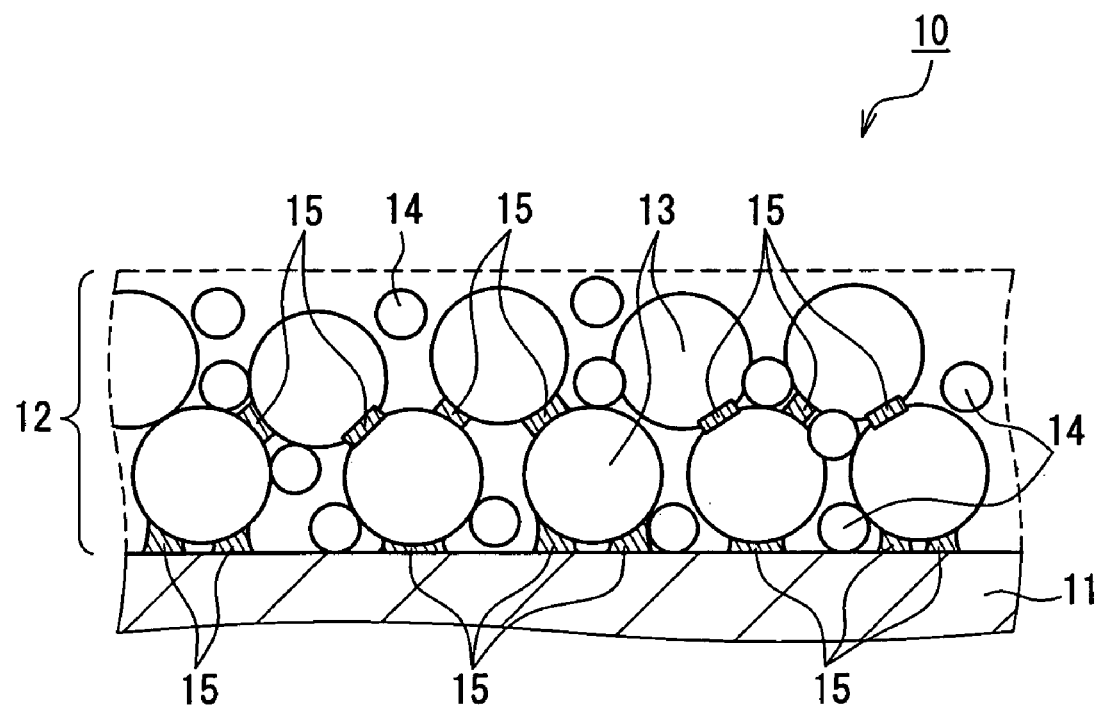
FIG. 5 schematically shows still another example of a nonaqueous electrolyte secondary battery of the present invention.

FIG. 5 shows still another example of the configuration of a negative electrode in the secondary battery of the present invention. In comparison with the negative electrode 10 of FIG. 2, the negative electrode 10 of FIG. 5 further includes metallic bond containing the element R (the metallic bond parts 15) formed between a part of active material particles 13 and a collector 11. Alternatively, in comparison with the negative electrode 10 of FIG. 4, the negative electrode 10 of FIG. 5 further includes metallic bond containing the element R (the metallic bond parts 15) formed between the active material particles 13.

As previously described, the metallic bond part 15 in the negative electrode 10 can suppress absorption and desorption of lithium at the time of charging and discharging of the battery, and accordingly the expanding and contracting of the metallic bond part 15 can be suppressed. That is, in the negative electrode 10 of FIG. 5, coupling between the active material particles 13 and the collector 11 as well as coupling between the active material particles 13 can be made more firmly than conventional one. Therefore, even in the case where Si contained in the active material particles 13 expands and contracts due to the charging and discharging of the battery (due to the absorption and desorption of lithium), phenomena such as desorption of the active material particles 13 from the active material layer 12, the occurrence of breaking in the active material layer 12 and the peeling-off of the active material particles 13 (the active material layer 12) from the surface of the collector 11 can be suppressed. Additionally, the electronic conductivity between the active material layer 12 and the collector 11 can be maintained favorably. That is, a secondary battery with excellent charging/discharging cycle characteristics, more specifically, a secondary battery in which deterioration of the conductivity of the negative electrode due to charging/discharging cycle is suppressed more, can be realized.

The following describes a method for manufacturing a nonaqueous electrolyte secondary battery of the present invention.

The manufacturing method of the present invention is for manufacturing a nonaqueous electrolyte secondary battery including a positive electrode and a negative electrode capable of absorbing and desorbing lithium reversibly, and a nonaqueous electrolyte having lithium conductivity. A general manufacturing method used for nonaqueous electrolyte secondary batteries is applicable other than for a manufacturing method of a negative electrode (for example, a manufacturing method of the positive electrode and a manufacturing method of a nonaqueous electrolyte secondary battery as shown in FIG. 1 using the manufactured positive and negative electrodes). In the following, the description that has been already described as above, such as for the materials used for the elements, will be omitted.

FIGS. 6A to 6D show one example of the manufacturing method of the present invention.

Figure 6A:
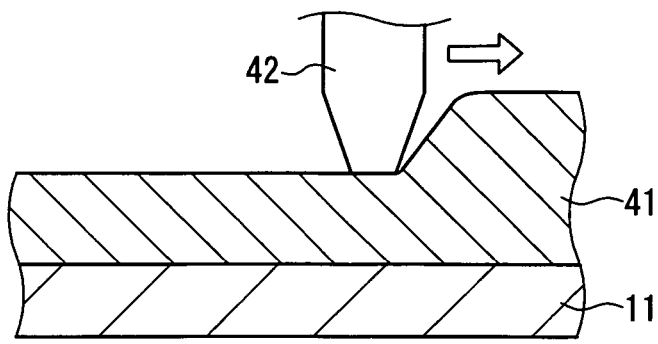
FIG. 6A to FIG. 6D schematically show one example of a manufacturing method of a nonaqueous electrolyte secondary battery of the present invention.

Firstly, as shown in FIG. 6A, a slurry 41 is applied to a surface of a collector 11 containing Cu with a content of 95 mass % or more, the slurry 41 including active material particles containing Si and at least one element R selected from Sn, In, Ga, Pb and Bi. Subsequently, as shown in FIG. 6B, the slurry 41 is dried so as to form a sheet 43, in which a precursor layer 44 is formed on the surface of the collector 11 (step (i)).

Figure 6B:
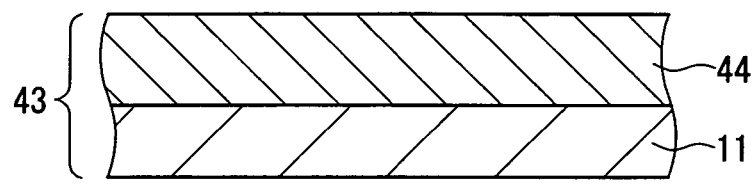
Figure 6C:
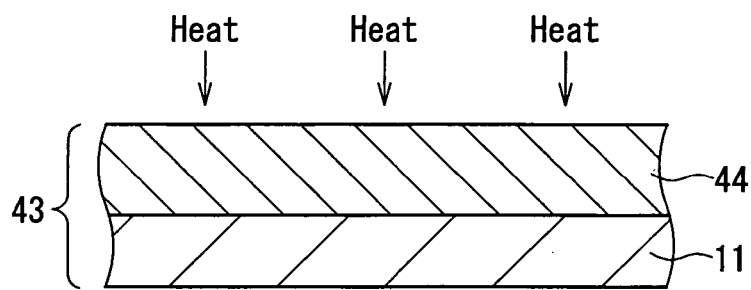
Figure 6D:
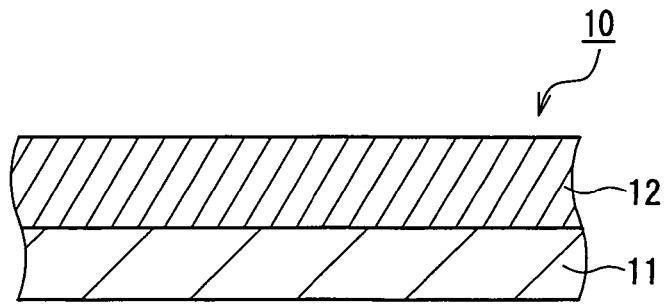

Next, as shown in FIG. 6C, the sheet 43 is heat-treated in a non-oxidizing atmosphere at a temperature ranging from 80° C. to 350° C. (step (ii)). The active material particles contain the element R, and the element R can form an alloy (preferably, a solid solution) with Cu at a relatively low temperature (e.g., at 350° C. or less). Therefore, as a result of the heat treatment of step (ii), the metal element (particularly, Cu) contained in the collector 11 and the metal element (particularly, the element R) in the active material particles adjacent to the collector can disperse mutually, so that metallic bond (metallic bond parts) can be formed therebetween. That is, a negative electrode 10 of a secondary battery of the present invention can be obtained, in which the metallic bond (metallic bond parts) containing the element R is formed between a part of the active material particles and the collector as shown in FIG. 4 and FIG. 5 (FIG. 6D).

As the collector 11 and the active material particles, the above-described collectors 11 and the active material particles may be used. The slurry including the active material particles can be applied by a general application method such as doctor blade technique. In FIG. 6A, a blade 42 is shifted in the direction of the arrow, whereby the slurry 41 can be applied with a substantially uniform thickness. Following the application of the slurry and the drying, the sheet 43 may be dried or rolled as needed. The thickness of the slurry 41 applied may be similar to the thickness of the active material layer 12 to be formed, for example.

In the manufacturing method of FIGS. 6A to 6C, it is preferable that the active material particles further contain a transition metal element M. The element M is not limited particularly, and above all Ti (titanium) is used preferably as the element M. Such active material particles can be formed, for example, by mixing elements as raw materials by an atomizing method or a mechanical milling method so as to turn them into an alloy. Herein, as described previously, the element R preferably exists in the vicinity of the surfaces of the active material particles.

The slurry 41 may include arbitrary materials in addition to the active material particles as needed. For instance, it further may include a conductive agent and a binder. As the conductive agent, a carbon-based material such as graphite, activated carbon, acetylene black or carbon black, metal powder such as nickel or copper and a mixture of them may be used.

Among them, the slurry 41 preferably includes a conductive agent containing a transition metal element L further. The element L is not limited particularly, and above all Cu (copper) is used preferably as the element L. As a result of the heat treatment of step (ii), the element L (particularly Cu) contained in the conductive agent and the metal element (particularly the element R) in the active material particles can disperse mutually, thus further forming metallic bond (metallic bond parts) therebetween. That is, a negative electrode 10 in a secondary battery of the present invention can be obtained, in which the metallic bond (the metallic bond parts) further can be formed between the active material particles so as to contain the element R as shown in FIG. 5.

The binder is not limited particularly as long as it enables the adhesion between the active material particles and between the active material and the collector and does not adversely affect the battery characteristics in a reducing atmosphere (potential range of 0 V to 2 V with respect to lithium). For instance, rubber based materials, polyvinylidene fluoride and its derivatives may be used for this purpose. A binder having conductivity may be used also.

In the step (i), the method for forming the precursor layer 44 by drying the slurry 41 is not limited particularly. For instance, the slurry 41 may be dried by air-drying or by drying using heating.

The optimum heat-treatment temperature in step (ii) varies with types of the element R. In the case where the element R is Sn, the optimum heat-treatment temperature resides in the range of 100° C. to 200° C., for example. In the case where the element R is In, the optimum temperature resides in the range of 150° C. to 250° C., for example. In the case where the element R is Ga, the optimum temperature resides in the range of 150° C. to 250° C., for example. In the case where the element R is Pb, the optimum temperature resides in the range of 250° C. to 350° C., for example. In the case where the element R is Bi, the optimum temperature resides in the range of 200° C. to 300° C., for example.

The atmosphere for the heat treatment in step (ii) is not limited particularly as long as it is a non-oxidizing atmosphere. Above all, a reducing atmosphere is preferable. The heat treatment in a reducing atmosphere allows the removal of an oxide coating on the active material particles, thus enabling favorable electronic conductivity of the active material particles. The non-oxidizing atmosphere, for example, includes a vacuum atmosphere, an Ar atmosphere, a hydrogen atmosphere, an Ar+hydrogen mixed atmosphere and a nitrogen+hydrogen mixed atmosphere. Among them, the atmosphere containing hydrogen is preferable because it is a reducing atmosphere.

FIGS. 7A to 7E show another example of the manufacturing method of the present invention.

Figure 7A:
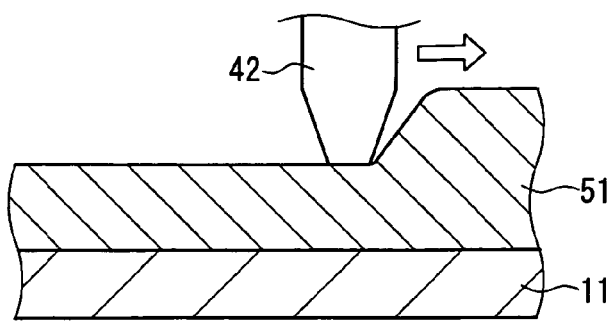
FIG. 7A to FIG. 7E schematically show another example of a manufacturing method of a nonaqueous electrolyte secondary battery of the present invention.
Figure 7B:
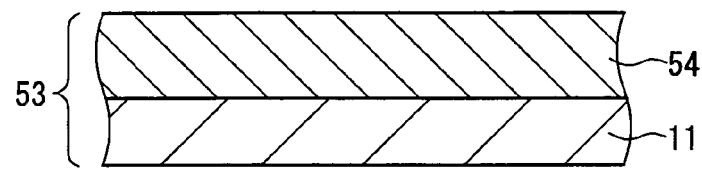

Firstly, as shown in FIG. 7A, a slurry 51 including active material particles containing Si is applied to a surface of a collector 11 containing Cu with a content of 95 mass % or more. Subsequently, as shown in FIG. 7B, the slurry 51 is dried so as to form a sheet 53, in which a precursor layer 54 is formed on the surface of the collector 11 (step (I)).

Figure 7C:
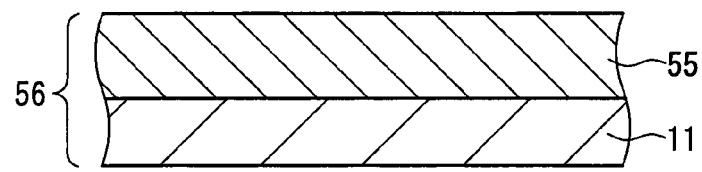

Next, as shown in FIG. 7C, a film containing at least one element R selected from Sn, In, Ga, Pb and Bi is formed on the surface of the active material particles included in the precursor layer 54, so that a sheet 56 is formed, in which a precursor layer 55 is formed on the surface of the collector 11 (step (II)).

Figure 7D:
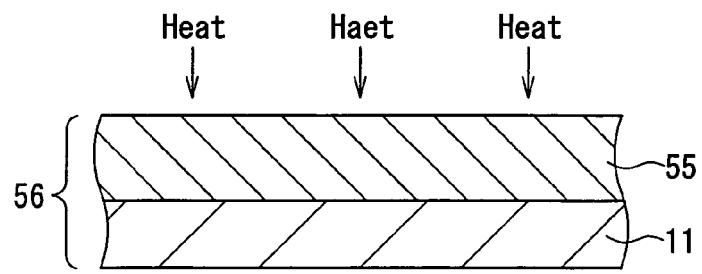
Figure 7E:
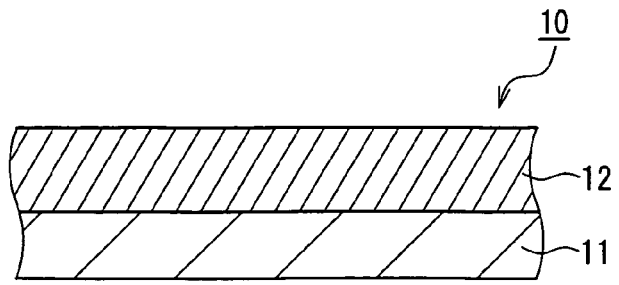

Next, as shown in FIG. 7D, the sheet 56 is heat-treated in a non-oxidizing atmosphere at a temperature ranging from 80° C. to 350° C. (step (III)). The active material particles contain the element R, and the element R can form an alloy (preferably, a solid solution) with Cu at a relatively low temperature (e.g., at 350° C. or less). Therefore, as a result of the heat treatment of step (III), the metal element (particularly, Cu) contained in the collector 11 and the metal element (particularly, the element R) on the surfaces of the active material particles adjacent to the collector can disperse mutually, so that metallic bond (metallic bond parts) can be formed therebetween. That is, a negative electrode 10 of a secondary battery of the present invention can be obtained, in which the metallic bond (metallic bond parts) containing the element R is formed between a part of the active material particles and the collector as shown in FIG. 4 and FIG. 5 (FIG. 7E).

As the collector 11 and the active material particles, the above-described collectors 11 and the active material particles may be used. The slurry 51 including the active material particles can be applied and dried in a similar manner to step (i).

In the manufacturing method of FIGS. 7A to 7E, similarly to the manufacturing method of FIGS. 6A to 6D, it is preferable that the active material particles further contain a transition metal element M. The element M is not limited particularly, and above all Ti (titanium) is particularly preferable as the element M. Such active material particles can be formed, for example, by mixing elements as raw materials by an atomizing method or a mechanical milling method so as to turn them into an alloy. Herein, as described previously, the element R preferably exists in the vicinity of the surfaces of the active material particles.

Similarly to the slurry 41, the slurry 51 may include arbitrary materials in addition to the active material particles as needed. For instance, it further may include a conductive agent and a binder. Above all, the slurry 51 preferably includes a conductive agent containing a transition metal element L further. The element L is not limited particularly, and above all Cu (copper) is used preferably as the element L. As a result of the heat treatment of step (III), the element L (particularly Cu) contained in the conductive agent and the metal element (particularly the element R) in the active material particles can disperse mutually, thus further forming metallic bond (metallic bond parts) therebetween. That is, a negative electrode 10 in a secondary battery of the present invention can be obtained, in which the metallic bond (the metallic bond parts) further can be formed between the active material particles so as to contain the element R as shown in FIG. 5.

The method of forming the film containing the element R on the surfaces of the active material particles in step (II) is not limited particularly. For instance, at least one method selected from plating and chemical vapor deposition (CVD) may be used for forming the film containing the element R. As the plating, electroless plating and electroplating may be used, for example. Among them, plating enables more uniform adhesion of the element R to the surfaces of the active material particles included in the sheet 53, which includes the inside of the sheet 53 also.

The step (III) may be conducted in a similar manner to step (ii).

The manufacturing method of the present invention may include the following steps, more specifically:

(a) forming a first sheet by applying a slurry including active material particles and a conductive agent on the surface of a collector, followed by drying, where the active material particles contain Si and at least one element R selected from Sn, In, Ga, Pb and Bi and the conductive agent contains Cu; and (b) heat-treating the first sheet in a non-oxidizing atmosphere at a temperature ranging from 80° C. to 350° C., so as to form a negative electrode.

The step (a) and the step (b) may be performed in a similar manner to the method of FIGS. 6A to 6D. In this manufacturing method, as a result of the heat treatment in step (b), the metal element (particularly, Cu) contained in the conductive agent and the metal element (particularly, the element R) in the active material particles can disperse mutually, so that metallic bond (metallic bond parts) can be formed between the active material particles. That is, a negative electrode 10 of a secondary battery of the present invention can be obtained, in which the metallic bond (metallic bond parts) containing the element R is formed between the active material particles as shown in FIG. 2 and FIG. 5. At this time, by using as the collector a collector containing Cu with a content of 95 mass % or more, a negative electrode of a secondary battery of the present invention can be obtained as shown in FIG. 5, in which metallic bond (metallic bond parts) containing the element R further can be formed between the collector and the active material particles as described above. As the active material particles or the like, those similar to the example of FIGS. 6A to 6D are available. For instance, it is preferable that the active material particles further contain a transition metal element M. The element M is not limited particularly, and above all Ti (titanium) is used preferably as the element M. Such active material particles can be formed, for example, by mixing elements as raw materials by an atomizing method or a mechanical milling method so as to turn them into an alloy. Herein, as described previously, the element R preferably exists in the vicinity of the surfaces of the active material particles.

Further, the manufacturing method of the present invention further may include the following steps:

(A) forming a first sheet by applying a slurry including active material particles containing Si and a conductive agent containing Cu on the surface of a collector, followed by drying;

(B) forming a second sheet by forming a film containing at least one element R selected from Sn, In, Ga, Pb and Bi on the surfaces of the active material particles and the conductive agent; and (C) forming a negative electrode by heat-treating the second sheet in a non-oxidizing atmosphere at a temperature ranging from 80° C. to 350° C.

The step (A) to step (C) may be performed in a similar manner to the method of FIGS. 7A to 7E. In this manufacturing method, as a result of the heat treatment in step (C), the metal element (particularly, Cu) contained in the conductive agent and the metal element (particularly, the element R) on the surfaces of the active material particles can disperse mutually, so that metallic bond (metallic bond parts) can be formed between the active material particles. That is, a negative electrode 10 of a secondary battery of the present invention can be obtained, in which the metallic bond (metallic bond parts) containing the element R is formed between the active material particles as shown in FIG. 2 and FIG. 5. At this time, by using as the collector a collector containing Cu with a content of 95 mass % or more, a negative electrode of a secondary battery of the present invention can be obtained in which metallic bond (metallic bond parts) containing the element R further can be formed between the collector and the active material particles as described above. As the active material particles or the like, those similar to the example of FIGS. 7A to 7E are available. For instance, it is preferable that the active material particles further contain a transition metal element M. The element M is not limited particularly, and above all Ti (titanium) is used preferably as the element M. Such active material particles can be formed, for example, by mixing elements as raw materials by an atomizing method or a mechanical milling method so as to turn them into an alloy. Herein, as described previously, the element R preferably exists in the vicinity of the surfaces of the active material particles.

Further, the manufacturing method of the present invention further may include the following steps:

($\alpha$) forming a first sheet by applying a slurry including active material particles containing Si and an additive containing at least one element R selected from Sn, In, Ga, Pb and Bi on the surface of a collector; and ($\beta$) forming a negative electrode by heat-treating the first sheet in a non-oxidizing atmosphere at a temperature ranging from 80° C. to 350° C.

The step ($\alpha$) and the step ($\beta$) may be performed in a similar manner to the method of FIGS. 6A to 6D. In this manufacturing method, as a result of the heat treatment in step ($\beta$), the metal element (particularly, Cu) contained in the conductive agent or the collector and the metal element (particularly, the element R) contained in the additive can disperse mutually, so that metallic bond (metallic bond parts) can be formed between the active material particles and/or between the collector and the active material particles. That is, a negative electrode 10 of a secondary battery of the present invention can be obtained in which the metallic bond (metallic bond parts) containing the element R is formed between the active material particles and/or between the collector and the active material particles as shown in FIG. 2, FIG. 4 or FIG. 5. At this time, by using as the collector a collector containing Cu with a content of 95 mass % or more, metallic bond (metallic bond parts) containing the element R can be formed more securely between the collector and the active material particles. Further, in the step ($\alpha$), if the slurry further contains a conductive agent containing Cu, metallic bond (metallic bond parts) containing the element R can be formed more securely between the active material particles. As the active material particles or the like, those similar to the example of FIGS. 6A to 6D are available. For instance, it is preferable that the active material particles further contain a transition metal element M. The element M is not limited particularly, and above all Ti (titanium) is used preferably as the element M. Such active material particles can be formed, for example, by mixing elements as raw materials by an atomizing method or a mechanical milling method so as to turn them into an alloy. Herein, as described previously, the element R preferably exists in the vicinity of the surface of the active material particles.

After obtaining the negative electrodes by these manufacturing methods, nonaqueous electrolyte secondary batteries may be made using the thus manufactured negative electrodes. As described previously, a general manufacturing method used for nonaqueous electrolyte secondary batteries is applicable to methods other than for a manufacturing method of the negative electrode. For example, a positive electrode can be formed by applying paste containing a positive electrode active material to a positive electrode collector, followed by drying and rolling. Subsequently, for example, the positive electrode and the negative electrode may be wound with a separator sandwiched therebetween, so as to configure an electrode plate group. The thus configured electrode plate group is inserted into a case, and a nonaqueous electrolyte solution is poured into the case. Finally, the case is sealed with a sealing plate. Thus, a nonaqueous electrolyte secondary battery can be formed.

In the manufacturing methods of the present invention, a heat treatment is performed at a low temperature (e.g., at 350° C. or less), whereby metallic bond (metallic bond parts) is formed between the collector and the active material particles and/or between the active material particles. If the heat treatment is performed at a high temperature of 400° C. or more, there is a high possibility that the size of crystallites in the active material particles becomes too large. Too large size of the crystallites leads to a tendency of breaking in the active material particles at the time of charging and discharging as described above. According to the manufacturing methods of the present invention, the heat treatment is performed at a low temperature, whereby an increase in size of the crystallites in the active material particles can be suppressed, so that a nonaqueous electrolyte secondary battery with excellent charging/discharging cycle characteristics can be obtained.

EXAMPLES

The following is more a detailed description of the present invention by way of Examples. Note here that the present invention is not limited to the following examples.

In the examples, nonaqueous electrolyte secondary batteries were manufactured actually and their battery characteristics (discharging capacities, charging/discharging cycle characteristics and the like) were evaluated. The following describes manufacturing methods of the batteries and evaluation methods of the characteristics.

Comparative Example 1

In Comparative Example 1, fifteen types of samples for the comparative example were manufactured (Comparative Example Samples 101 to 115).

(Negative Electrode Active Materials in Comparative Example Samples 101 to 104)

As a negative electrode active material for Sample 101, natural graphite (produced by Nippon Graphite Industries Ltd.) was used whose average particle diameter was made 32 µm or less with a sieve. As a negative electrode active material for Sample 102, Si powder was used as it was (produced by Koujundo Chemical Laboratory Co., Ltd., purity: 99.9%, average particle diameter: 10 µm or less). As a negative electrode active material for Sample 103, the above-stated Si powder was subjected to mechanical milling in an Ar atmosphere, and the thus obtained impalpable Si powder was used (average particle diameter: 8 µm or less). The mechanical milling was performed using an Atrita Ball Mill for 3 hours, into which Si powder and stainless steel balls were charged at a mass ratio of 1:10.

A negative electrode active material for Sample 104 was manufactured by the following method. Firstly, the Si powder used as the negative electrode active material for Sample 102 and Al powder (produced by Koujundo Chemical Laboratory Co., Ltd., purity: 99.9%, average particle diameter: 20 µm or less) were mixed at a mass ratio of 1:1, which was then subjected to an atomizing method to obtain powder with an average particle diameter of 15 µm. Next, the thus prepared powder and stainless steel balls that were 10 times in terms of the mass ratio were charged in an Atrita Ball Mill, followed by mechanical milling for 3 hours in an Ar atmosphere, whereby the negative electrode active material for Sample 104 was manufactured.

(Negative Electrode Active Materials in Comparative Samples 105 to 115)

Firstly, Si powder (produced by Koujundo Chemical Laboratory Co., Ltd., purity: 99.9%, average particle diameter: 20 µm) and powder of a single transition metal element M among those listed in the following Table 1A (produced by Koujundo Chemical Laboratory Co., Ltd., purity: 99.9%, average particle diameter: 20 to 26 µm) were mixed with a mass ratio shown in Table 1A, followed by turning it into an alloy by an atomizing method so as to obtain alloy powder with an average particle diameter in the range of about 17 µm to 23 µm. Each of these alloys included a crystalline phase, and average diameters of those crystallites ranged from 3 µm to 7 µm.

Next, the thus obtained alloy powder was subjected to mechanical milling together with stainless-steel balls (alloy: balls=1:10 (mass ratio)) in an Atrita Ball Mill at a constant rotation speed (6,000 rpm) for 3 hours. Next, the thus obtained alloy power was taken out in an Ar atmosphere, which was used for active material powder for Comparative Samples 105 to 115.

(Evaluation of Negative Electrode Active Materials)

With respect to each active material powder (active material particles) as a negative electrode active material, crystal structure analysis using X-ray diffraction and observation with a transmission electron microscope (TEM) were conducted. From these measurements, it was confirmed that each active material powder was an amorphous alloy having two phases of a Si phase and a phase made of an intermetallic compound containing Si, and $MSi_2$ (M: transition metal element) was present in the phase made of an intermetallic compound containing Si. Above all, in the case where the transition metal element M was Ti, Ni, Co or Zr, almost all of the phases made of intermetallic compounds were $MSi_2$ phase. Further, the average particle diameter of the active material powder was in the range of 1.2 µm to 3.3 µm. It was confirmed by the TEM observation that the average diameter of the crystallites included in the active material powder was in the range of about 8 nm to 38 nm. When the amount of oxygen contained in the active material powder was measured by an infrared-absorbing method (specified by JIS Z 2613), the measurement was 2 mass % or less in every active material powder. Those measurement results are shown in Table 1A. Herein, M (mass %) and Si (mass %) show a mixture ratio of the element M and Si at the time of forming an alloy. The average diameter (nm) of crystallites, the amount of oxygen (mass %) and the average particle diameter (µm) were values after the mechanical milling.

TABLE 1A

| Sample No. | composition of negative electrode active material | M mass % | Si mass % | avg. diameter of Si phase crystallites (nm) | avg. diameter of $MSi_2$ phase crystallites (nm) | oxygen amount mass % | avg. particle diameter (µm) |
|---|---|---|---|---|---|---|---|
| 101 | Graphite | — | — | — | — | 0.01 | 18 |
| 102 | Si | 100 | 0 | — | — | 0.04 | 6 |
| 103 | Si | 100 | 0 | 35 | — | 2.4 | 2.1 |
| 104 | Si—Al | 50 | 50 | 24 | 42(Al) | 1.7 | 1.7 |
| 105 | Si—Cu | 47 | 53 | 15 | 30 | 1.1 | 1.5 |
| 106 | Si—Cu | 42 | 58 | 18 | 38 | 1.2 | 1.8 |
| 107 | Si—Ti | 41 | 59 | 10 | 15 | 0.6 | 2.1 |
| 108 | Si—Ti | 37 | 63 | 12 | 19 | 0.8 | 2.6 |
| 109 | Si—Ti | 32 | 68 | 14 | 21 | 0.9 | 2.9 |
| 110 | Si—Ni | 48 | 52 | 8 | 10 | 1.2 | 2.8 |
| 111 | Si—Ni | 46 | 54 | 10 | 16 | 1.1 | 3.1 |
| 112 | Si—Co | 48 | 52 | 20 | 36 | 1.1 | 2.7 |
| 113 | Si—Co | 46 | 54 | 19 | 29 | 1.2 | 3.3 |
| 114 | Si—Fe | 45 | 55 | 23 | 30 | 1.3 | 1.8 |
| 115 | Si—Zr | 50 | 50 | 15 | 26 | 0.7 | 1.2 |

(Manufacturing of Negative Electrodes)

10 g of the negative electrode active material manufactured as stated above was mixed with 0.8 g of fibrous carbon powder (produced by SHOWA DENKO K.K., VGCF) as a conductive agent and 0.5 g of polyacrylic acid (Wako Pure Chemical Industries, Ltd. molecular weight: about 150,000) as a binder so as to produce a mixture. Following this, 10 g of pure water was added to this mixture, which was then kneaded so as to produce a negative electrode slurry.

Next, the thus produced slurry was applied to one side of copper foil as a negative electrode collector (electrolytic copper foil, Cu purity: 99.99% or more, produced by Furukawa Electric Co., Ltd., thickness: 10 μm, surface roughness: 0.2 μm). At this time, the slurry was applied so that the thickness after drying was 40 μm. After that, the thus obtained sheet was dried in an Ar airflow at 60° C., whereby a negative electrode sheet was manufactured. Next, the thus obtained negative electrode sheet was cut out into a circle with a diameter of 12.5 mm, so that a circle negative electrode 24 was manufactured as shown in FIG. 1.

(Manufacturing of Flat-Shaped Battery)

Using the thus manufactured negative electrode, a flat-shaped battery 20 shown in FIG. 1 (nonaqueous electrolyte secondary battery) was manufactured. The battery 20 included a case 22 doubling as a positive electrode terminal, a positive electrode 21, a separator 23, a negative electrode 24, a gasket 25 and a sealing plate 26 doubling as a negative electrode terminal.

Firstly, $Li_2CO_3$ and $CoCO_3$ were mixed at a predetermined molar ratio, which was then heated at 950° C. to be synthesized as $LiCoO_2$. This was further classified by size to include 100 mesh or less, and thus a positive electrode active material was obtained. 100 g of this positive electrode active material, 5 g of acetylene black as a conductive agent and 4 g of polyvinylidene fluoride (resin content: 4 g, actually used as N-methyl-2-pyrrolidone (NMP) solution) as a binder were mixed, thus obtaining a positive electrode slurry. This positive electrode slurry was applied onto aluminum foil as a positive electrode collector, which was dried and then rolled so as to obtain a positive electrode sheet. At this time, the application amount of the slurry was adjusted so that the positive electrode capacity and the negative electrode capacity were equal to each other. This positive electrode sheet was cut out into a circle with a diameter of 12 mm, so that a circle positive electrode 21 was manufactured as shown in FIG. 1.

Next, a separator 23 made of polyethylene (thickness: 27 μm) was put between the positive electrode 21 and the negative electrode 24. At this time, the separator 23 was disposed so that the mixture side (the side of the active material layer) of the positive electrode 21 and the mixture side (the side of the active material layer) of the negative electrode 24 face the separator 23. Next, the positive electrode, the negative electrode and the separator were impregnated with an electrolyte solution sufficiently. The electrolyte solution was prepared by dissolving $LiPF_6$ in a mixed solution of ethylene carbonate and diethyl carbonate (ethylene carbonate:diethyl carbonate=1:3 (volume ratio)) to have a concentration of 1 mol/L. Next, the positive electrode, the negative electrode and the separator were put inside the case 22, and the case 22 was sealed with the gasket 25 and the sealing plate 26. At this time, the collector (aluminum foil) of the positive electrode 21 was connected electrically with the case 22 and the collector (copper foil) of the negative electrode 24 was connected electrically with the sealing plate 26. The case 22 and the sealing plate 26 were isolated by the gasket 25. In this way, a flat-shaped battery as shown in FIG. 1 was manufactured, which was then evaluated concerning the following battery characteristics.

(Measurement of Discharging Capacity and Charging/Discharging Cycle Test)

The thus manufactured batteries were subjected to the measurement of discharging capacity and the charging/discharging cycle test in a thermostatic chamber with a temperature set at 20° C. Firstly, each battery was charged with a constant current of 0.2C (1C represents 1 hour-rate current) so that a battery voltage reached 4.05 V. Next, the battery was charged with a constant voltage of 4.05 V so that a charging current reached 0.01C. Thereafter, the battery was discharged with a constant current of 0.2C so that the battery voltage reached 2.5 V. The battery capacity was measured at this time.

Next, a charging/discharging cycle test was carried out. The charging process was carried out as follows: the battery was charged with a constant current of 1C so that the battery voltage reached 4.05 V and thereafter, was charged with a constant voltage of 4.05 V so that the battery current reached 0.05C. The discharging process was carried out as follows: the battery was discharged with a constant current of 1C so that the battery voltage reached 2.5 V. The charging/discharging cycle where one cycle includes the above charging process and discharging process was repeated 250 times. Then, a ratio of the discharging capacity at the $250^{th}$ cycle to the discharging capacity at the $2^{nd}$ cycle was determined, and then the value was multiplied by 100 to obtain a capacity maintaining rate (%). A capacity maintaining rate closer to 100 shows better cycle life (excellent charging/discharging cycle characteristics).

(Measurement of Expansion Rate)

Expansion rates of the negative electrodes in the batteries were measured as follows. The battery subjected to the first charging (initial charging) after assembly was disassembled into a positive electrode, a negative electrode and a separator. Next, the negative electrode was washed with diethyl carbonate and was dried in a dry air atmosphere. The thickness of the negative electrode in this state was measured, which was defined as the thickness of the negative electrode after the initial charging. In order to compare this thickness with the thickness of the negative electrode before assembling of the battery, the expansion rate of the negative electrode was calculated from the formula: [expansion rate of a negative electrode] (%)={(thickness after initial charging)/(thickness before assembling of a battery)}×100.

The following Table 1B shows the measurement results of the discharging capacity, the results of the charging/discharging cycle test and the measurement results of the expansion rate for each battery.

TABLE 1B

| Sample No. | Compositions of negative electrode active materials | Discharging capacity (mAh) | Capacity maintaining rate (%) | Expansion rate (%) |
|---|---|---|---|---|
| 101 | graphite | 13 | 91 | 109 |
| 102 | Si | 85 | 8 | 359 |
| 103 | Si | 79 | 16 | 296 |
| 104 | Si—Al | 65 | 23 | 246 |
| 105 | Si—Cu | 62 | 48 | 153 |
| 106 | Si—Cu | 68 | 39 | 167 |

TABLE 1B-continued

| Sample No. | Compositions of negative electrode active materials | Discharging capacity (mAh) | Capacity maintaining rate (%) | Expansion rate (%) |
|---|---|---|---|---|
| 107 | Si—Ti | 59 | 55 | 144 |
| 108 | Si—Ti | 65 | 51 | 152 |
| 109 | Si—Ti | 70 | 49 | 159 |
| 110 | Si—Ni | 58 | 50 | 149 |
| 111 | Si—Ni | 64 | 43 | 154 |
| 112 | Si—Co | 58 | 48 | 148 |
| 113 | Si—Co | 65 | 41 | 155 |
| 114 | Si—Fe | 63 | 49 | 152 |
| 115 | Si—Zr | 66 | 51 | 156 |

As shown in Table 1B, Samples 102 to 115 using negative electrode active materials containing Si had higher capacities than Sample 101 using graphite as the negative electrode active material. Further, Samples 105 to 115 were excellent in charging/discharging cycle characteristics as compared with Samples 102 to 104. Samples 105 to 115, however, had lower capacity maintaining rates after 250 cycles than Sample 101, and the expansion rates of the negative electrodes were as large as 140% or more, which were improved as compared with Samples 102 to 104, though. When the internal resistances of Samples 105 to 115 after 250 cycles were analyzed, the electric resistances of the negative electrodes were increased by about 100 times from the resistances at the initial charging. It is conceivable that the conductivity of the negative electrodes was degraded because of breaking of the negative electrode active material and the peeling-off of the negative electrode active material layer from the collector.

The negative electrodes used in Samples 103 to 115 were heat-treated in a non-oxidizing atmosphere and were used to manufacture batteries by the above-described methods, and the battery characteristics of them were evaluated. As a result of a heat treatment at 400° C. or less, the batteries showed substantially the same battery characteristics as those of an untreated negative electrode. On the other hand, as a result of a heat treatment at 400° C. or higher, the capacity maintaining rates after the charging/discharging cycle test further were degraded. When the average diameter of the crystallites of the active material in the negative electrode heat-treated at 500° C. was measured, the average diameter was increased considerably to be as large as about 80 nm to 150 nm. Further, it was observed with an electron microscope that breaking in particles occurred in the negative electrode active material itself. It is conceivable that the crystallites in the negative electrode active material were enlarged due to the heat treatment, which caused the tendency of breaking in particles of the active material during the charging/discharging cycle. The analysis of internal resistance showed that the resistance between the active material and the collector increased remarkably. Presumably, breaking in particles of the active material was likely to occur in the vicinity of the collector.

Example 1

Subsequently, Samples as examples (Samples 1 to 28) were manufactured.

Firstly, a negative electrode active material was prepared, which was used in Comparative Example Sample 108 and whose composition was Si—Ti. This active material was charged into an Atrita Ball Mill together with balls made of zirconia (ratio of active material:balls=1:3 (mass ratio)), and powder of an element R shown in Table 2A was added thereto in the amount of addition shown in Table 2A. The amount of addition of an element R in Table 2A shows the amount when the total of Si and Ti as a transition metal element M is defined as 100 mass parts. This also applies to the subsequent tables. As powder of the element R, the following were used: for Sn powder, powder of 99.9% purity and 2 μm in average particle diameter was used. For In powder, powder of 99.9% purity and 4 μm in average particle diameter was used. For Ga powder, powder of 99.9% purity and 4 μm in average particle diameter was used. For each of Pb powder and Bi powder, powder of 99.9% purity and 3 μm in average particle diameter was used. Mixed powder of the above-described active material and the powder of the element R were subjected to mechanical milling in an Ar atmosphere at a rotation speed of 6,000 rpm for 1 hour, whereby a negative electrode active material (Samples 1 to 18, 21 to 28) was obtained. Further, the time of the mechanical milling was set at 3 hours or 10 hours (the other conditions were the same), and Samples 19 and 20 were obtained.

Next, when the thus obtained active materials were evaluated by X-ray diffraction, the added elements R were each detected in the state of a single element. Further, cross-sections of Si, Ti and the element R were observed by electron probe-microanalysis (EPMA). When the area of a cross section in which the element R was detected was measured, it was found that 90 atomic % or more of the added element R was present in the range from the surface of the particle to the depth of 0.1D, where D denotes the particle diameter of the active material particle. Further, when the composition ratio of the negative electrode active material was determined by ICP spectrochemical analysis, the actual amount of the element R in the negative electrode active material was different from the initially added amount. Conceivably, this results from the adhesion of the element R to the wall surface in the mill or to the ball surfaces.

Herein, as for Sample 19 subjected to the mechanical milling for 3 hours and Sample 20 for 10 hours, a part of the element R formed intermetallic compounds with Ti or Si. Further, the element R dispersed not only in the vicinity of the surface of the active material particles but also the inside thereof. Assuming that the particle diameter of the active material particle is D, only about 20 atomic % to 40 atomic % of the element R remained in the range from the surface to the depth of 0.1D, and all of the remaining was present at more inner parts of the active material particles.

The list of samples is shown in Table 2A. Herein, the oxygen amount (mass %) and the average particle diameter (μm) are values after mechanical milling. The oxygen amount was measured similarly to Comparative Example 1. These also apply to the following examples.

TABLE 2A

| Sample No. | Composition of negative electrode active materials | M mass % | Si mass % | Elements R | Addition amount of element R during manufacturing process (mass parts) | Actual content of elements R (mass %) | Oxygen amount (mass %) | Avg. particle diameter (μm) |
|---|---|---|---|---|---|---|---|---|
| 1 | Si—Ti | 37 | 63 | Sn | 10 | 7.2 | 0.8 | 2.7 |
| 2 | Si—Ti | 37 | 63 | Sn | 10 | 7.2 | 0.8 | 2.7 |
| 3 | Si—Ti | 37 | 63 | Sn | 10 | 7.2 | 0.8 | 2.7 |
| 4 | Si—Ti | 37 | 63 | Sn | 10 | 7.2 | 0.8 | 2.7 |
| 5 | Si—Ti | 37 | 63 | Sn | 10 | 7.2 | 0.8 | 2.7 |
| 6 | Si—Ti | 37 | 63 | Sn | 10 | 7.2 | 0.8 | 2.7 |
| 7 | Si—Ti | 37 | 63 | Sn | 10 | 7.2 | 0.8 | 2.7 |
| 8 | Si—Ti | 37 | 63 | Sn | 10 | 7.2 | 0.8 | 2.7 |
| 9 | Si—Ti | 37 | 63 | Sn | 10 | 7.2 | 0.8 | 2.7 |
| 10 | Si—Ti | 37 | 63 | Sn | 10 | 7.2 | 0.8 | 2.7 |
| 11 | Si—Ti | 37 | 63 | Sn | 10 | 7.2 | 0.8 | 2.7 |
| 12 | Si—Ti | 37 | 63 | Sn | 10 | 7.2 | 0.8 | 2.7 |
| 13 | Si—Ti | 37 | 63 | Sn | 10 | 7.2 | 0.8 | 2.7 |
| 14 | Si—Ti | 37 | 63 | Sn | 10 | 7.2 | 0.8 | 2.7 |
| 15 | Si—Ti | 37 | 63 | Sn | 10 | 7.2 | 0.8 | 2.7 |
| 16 | Si—Ti | 37 | 63 | Sn | 10 | 7.2 | 0.8 | 2.7 |
| 17 | Si—Ti | 37 | 63 | Sn | 10 | 7.2 | 0.8 | 2.7 |
| 18 | Si—Ti | 37 | 63 | Sn | 10 | 7.2 | 0.8 | 2.7 |
| 19 | Si—Ti | 37 | 63 | Sn | 10 | 6.8 | 1 | 2.5 |
| 20 | Si—Ti | 37 | 63 | Sn | 10 | 5.9 | 1.3 | 2.1 |
| 21 | Si—Ti | 37 | 63 | In | 10 | 6.3 | 0.7 | 2.7 |
| 22 | Si—Ti | 37 | 63 | Ga | 10 | 8.4 | 0.9 | 2.6 |
| 23 | Si—Ti | 37 | 63 | Pb | 10 | 7.1 | 0.8 | 2.7 |
| 24 | Si—Ti | 37 | 63 | Bi | 10 | 9 | 0.8 | 2.9 |
| 25 | Si—Ti | 37 | 63 | Sn | 1 | 0.3 | 0.7 | 2.6 |
| 26 | Si—Ti | 37 | 63 | Sn | 40 | 32 | 0.9 | 3.1 |
| 27 | Si—Ti | 37 | 63 | In | 1 | 0.4 | 0.6 | 2.6 |
| 28 | Si—Ti | 37 | 63 | In | 40 | 35 | 1.1 | 2.9 |

Next, the thus obtained negative electrode active materials as Samples 1 to 28 were used to manufacture negative electrodes in a similar manner to Comparative Example 1. Subsequently, a heat treatment was applied to the thus manufactured negative electrodes. Temperatures of the heat treatment were set at 60° C., 80° C., 100° C. and at intervals of 50° C. between 150° C. and 400° C. The heat treatment was carried out by raising a temperature at a rate of 20° C./minute up to a temperature intended, which then was maintained for 10 hours. After 10 hours elapsed, the heating was stopped and they were allowed to cool down to a room temperature by natural cooling. In the case of the heat treatment at 400° C., it took about 12 hours to let them cool down to a room temperature. There were two types of atmospheres for the heat treatment carried out, including an atmosphere of Ar gas only and a mixed gas atmosphere (reducing atmosphere) of Ar gas and $H_2$ gas (5 volume %). Heat-treatment condition for the respective samples are shown in Table 2B.

TABLE 2B

| Sample No. | Temperature (° C.) | Heat-treatment Atmosphere |
|---|---|---|
| 1 | 60 | Ar |
| 2 | 80 | Ar |
| 3 | 100 | Ar |
| 4 | 150 | Ar |
| 5 | 200 | Ar |
| 6 | 250 | Ar |
| 7 | 300 | Ar |
| 8 | 350 | Ar |
| 9 | 400 | Ar |
| 10 | 60 | Ar + $H_2$ (5%) |
| 11 | 80 | Ar + $H_2$ (5%) |
| 12 | 100 | Ar + $H_2$ (5%) |
| 13 | 150 | Ar + $H_2$ (5%) |
| 14 | 200 | Ar + $H_2$ (5%) |
| 15 | 250 | Ar + $H_2$ (5%) |
| 16 | 300 | Ar + $H_2$ (5%) |
| 17 | 350 | Ar + $H_2$ (5%) |
| 18 | 400 | Ar + $H_2$ (5%) |
| 19 | 150 | Ar + $H_2$ (5%) |
| 20 | 150 | Ar + $H_2$ (5%) |
| 21 | 200 | Ar + $H_2$ (5%) |
| 22 | 250 | Ar + $H_2$ (5%) |
| 23 | 350 | Ar + $H_2$ (5%) |
| 24 | 300 | Ar + $H_2$ (5%) |
| 25 | 150 | Ar + $H_2$ (5%) |
| 26 | 150 | Ar + $H_2$ (5%) |
| 27 | 200 | Ar + $H_2$ (5%) |
| 28 | 200 | Ar + $H_2$ (5%) |

The negative electrodes subjected to heat treatment were analyzed by X-ray diffraction. X-ray diffraction peaks showing intermetallic compounds of Cu and Sn such as $Cu_4Sn$, $Cu_3Sn$ and $CuSn$ were obtained from the negative electrodes using Sn as the element R, in the case of the heat treatment temperature at 80° C. or more. Furthermore, cross sections of the negative electrodes subjected to heat treatment were evaluated by X-ray photoelectron spectroscopy (ESCA). As a result, significantly strong peaks showing Cu—Sn bonding were observed at an interface between the negative electrode active material layer and the collector (copper foil).

X-ray diffraction and ESCA analysis were conducted also for the negative electrodes using elements other than Sn as the element R. As a result, peaks showing bonding of Cu and the element R or peaks showing an intermetallic compound of these were observed when a heat treatment at 100° C. or more was performed for the negative electrode using In as the element R, when a heat treatment at 200° C. or more was performed for the negative electrode using Ga as the element R, when a heat treatment at 300° C. or more was performed for the negative electrode using Pb as the element R and when a heat treatment at 250° C. or more was performed for the negative electrode using Bi as the element R. Furthermore, with the ESCA analysis, a state of a junction of active material particles via the element R was confirmed in the vicinity of an interface between the active material particles.

When active material particles were taken out of the negative electrodes subjected to heat treatment, whose size of crystallites were then evaluated using TEM, crystalline Si phase was observed at many portions in the samples subjected to heat treatment at 400° C., in which the average diameter of the crystallites exceeded 50 nm. Similarly, in a TiSi$_2$ phase also, crystallites were observed whose average diameter exceeded 50 nm.

Using the thus prepared negative electrodes, batteries were manufactured in a similar manner to Comparative Example 1, and their characteristics were evaluated. The battery characteristics were evaluated in a similar manner to Comparative Example 1. Table 2C shows the results.

TABLE 2C

| Sample No. | Discharging capacity (mAh) | Capacity maintaining rate (%) | Expansion rate (%) |
|---|---|---|---|
| 1 | 68 | 45 | 157 |
| 2 | 67 | 83 | 129 |
| 3 | 67 | 88 | 113 |
| 4 | 65 | 92 | 110 |
| 5 | 65 | 90 | 110 |
| 6 | 65 | 88 | 109 |
| 7 | 63 | 84 | 110 |
| 8 | 61 | 81 | 108 |
| 9 | 51 | 75 | 105 |
| 10 | 67 | 51 | 146 |
| 11 | 68 | 83 | 117 |
| 12 | 68 | 92 | 112 |
| 13 | 68 | 94 | 110 |
| 14 | 66 | 93 | 109 |
| 15 | 66 | 87 | 109 |
| 16 | 65 | 82 | 108 |
| 17 | 64 | 79 | 106 |
| 18 | 53 | 68 | 105 |
| 19 | 65 | 36 | 132 |
| 20 | 63 | 31 | 122 |
| 21 | 65 | 91 | 109 |
| 22 | 65 | 88 | 109 |
| 23 | 61 | 87 | 110 |
| 24 | 63 | 85 | 113 |
| 25 | 65 | 65 | 149 |
| 26 | 73 | 48 | 197 |
| 27 | 65 | 65 | 153 |
| 28 | 71 | 32 | 206 |

As shown in Table 2C, all of the samples had larger discharging capacities than Sample 101 as the comparative example, thus showing that all of the samples had higher capacity than the battery using graphite as the negative electrode. Further, many samples showed improved capacity maintaining rates and expansion rates as compared with Sample 108 as the comparative example having the same composition. Among them, Samples 2 to 18 and Samples 21 to 24 showed excellent results for all of their discharging capacities, capacity maintaining rates and expansion rates. Conceivably, this results from metallic bond containing the element R formed between the active material particles and/or between the active material particles and the collector by the heat treatment, which suppressed the expanding of the electrode, or enhanced their capacity maintaining rates by virtue of the securing of stable current collection.

When internal resistances of Samples 2 to 18 and Samples 21 to 24 were analyzed in a similar manner to Comparative Example 1, increases in resistance only 3 times to 5 times those of the batteries in the initial charging state were obtained from the measurement even after 250 charging/discharging cycles.

From these results, it was found that with a heat treatment in the range of 80° C. to 350° C., metallic bond containing a transition element (Cu) and the element R was formed between active material particles and a collector and between active material particle and active material particle, whereby a negative electrode and a nonaqueous electrolyte secondary battery with excellent charging/discharging cycle characteristics could be formed.

Sample 19 and Sample 20 had capacity maintaining rates lower than those of the other samples and exhibited larger expansion rates. When these electrodes were analyzed, metallic bond containing the element R was hardly formed. Conceivably, the expanding could not be suppressed because of this, thus degrading the collection capability of the negative electrodes. From these results, it can be considered that the effects of the present invention can be obtained more when the element R is present in the vicinity of the surfaces of the active material particles.

Example 2

Subsequently, samples as examples (Samples 29 to 32) were manufactured.

Firstly, negative electrode active materials were prepared, which were used for Comparative Example Samples 106, 111, 113 and 114. 10 mass parts of Sn powder (purity: 99.9%, average particle diameter: 2 μm) was added to these active materials. Subsequently, these mixed powders were subjected to mechanical milling for 1 hour under the same conditions as those for Samples 1 to 28, so that negative electrode active materials for Samples 29 to 32 were manufactured. Table 3A shows the list of these samples.

TABLE 3A

| Sample No. | Composition Si—M | M mass % | Si mass % | Element R | Amount of element R added (mass parts) | Actual content of element R (mass %) | Oxygen amount (mass %) | Avg. particle diameter (μm) |
|---|---|---|---|---|---|---|---|---|
| 29 | Si—Cu | 42 | 58 | Sn | 10 | 6.9 | 1.2 | 2.2 |
| 30 | Si—Ni | 46 | 54 | Sn | 10 | 7.4 | 1.4 | 3.1 |

TABLE 3A-continued

| Sample No. | Composition Si—M | M mass % | Si mass % | Element R | Amount of element R added (mass parts) | Actual content of element R (mass %) | Oxygen amount (mass %) | Avg. particle diameter (μm) |
|---|---|---|---|---|---|---|---|---|
| 31 | Si—Co | 46 | 54 | Sn | 10 | 8.2 | 1 | 3.4 |
| 32 | Si—Fe | 45 | 55 | Sn | 10 | 7.6 | 1.5 | 2 |

Next, using the thus obtained Samples 29 to 32, negative electrodes were manufactured in a similar manner to Comparative Example 1. Subsequently, a heat treatment was conducted to the manufactured negative electrodes in a similar manner to Example 1. The temperature of the heat treatment was set at 150° C., and the atmosphere of the heat treatment was a mixed gas atmosphere (reducing atmosphere) of Ar gas and $H_2$ gas (5 volume %).

The negative electrodes subjected to heat treatment were analyzed by X-ray diffraction. Since Sn was used as the element R, X-ray diffraction peaks showing intermetallic compounds of Cu and Sn such as $Cu_4Sn$, $Cu_3Sn$ and CuSn were obtained.

Further, cross sections of the negative electrodes subjected to heat treatment were evaluated by X-ray photoelectron Spectroscopy (ESCA). As a result, similarly to Example 1, significantly strong peaks showing Cu—Sn bonding were observed at an interface between the negative electrode active material layer and the collector (copper foil). Furthermore, with the ESCA analysis, a state of a junction via Sn was confirmed in the vicinity of an interface between active material particles.

Using the thus prepared negative electrodes, batteries were manufactured in a similar manner to Comparative Example 1, and their characteristics were evaluated. The battery characteristics were evaluated in a similar manner to Comparative Example 1. Table 3B shows the results.

TABLE 3B

| Sample No. | Discharging capacity (mAh) | Capacity maintaining rate (%) | Expansion rate (%) |
|---|---|---|---|
| 29 | 68 | 84 | 116 |
| 30 | 65 | 83 | 114 |
| 31 | 66 | 86 | 113 |
| 32 | 62 | 81 | 117 |

As shown in Table 3B, all of the samples had larger discharging capacities than Sample 101 as the comparative example. Further, Samples 29 to 32 all showed improved capacity maintaining rates and expansion rates as compared with Samples 106, 111, 113 and 114 having the same compositions.

When internal resistances of Samples 29 to 32 were analyzed in a similar manner to Comparative Example 1, increases in resistance only 3 times to 5 times those of the batteries in the initial charging state were obtained from the measurement even after 250 charging/discharging cycles.

From these results, it was found that with a heat treatment at 350° C. or less, metallic bond containing a transition element (Cu) and the element R was formed between active material particles and a collector and between active material particle and active material particle, whereby a negative electrode and a nonaqueous electrolyte secondary battery with excellent charging/discharging cycle characteristics could be formed.

Example 3

Firstly, a negative electrode active material used for Comparative Example Sample 108 was prepared (composition of Si—Ti). Next, Sn or In as the element R was attached by plating to the surface of this active material. Before conducting the plating of Sn and In, the surface of the active material was activated (application of Pd catalyst) as a pretreatment, and Cu-plating was performed by electroless plating as a primary coat. Sn-plating was performed by impregnating the Cu-plated active material with an electroless plating solution of Sn (pH=1.8, plating temperature: 40° C.) for 30 minutes. In-plating was performed by impregnating the Cu-plated active material with an electroless plating solution of In (pH=12, plating temperature: 25° C.) for 30 minutes. After plating Sn or In, the active material was washed with distilled water three times, which was then dried in a vacuum atmosphere at 110° C. for 10.5 hours, so that negative electrode active materials for Samples 33 to 42 shown in Table 4A were obtained.

When the composition ratios of the thus obtained active materials were quantified by ICP spectrochemical analysis, the actual contents of the element R were in the range from 9.9 mass % to 11.8 mass %. When cross sections of the active materials were EPMA analyzed, it was confirmed that all of the element R was present in the range from the surface to the depth of 0.1D, where D represents the particle diameter of the active material particle.

Subsequently, negative electrode active materials were manufactured by setting the impregnation time for the plating of Sn at 5 minutes, 8 minutes, 100 minutes and 120 minutes (Samples 43 to 62 shown in Table 4A). When ICP spectrochemical analysis was performed similarly to these active materials so as to quantify their composition ratios, the actual contents of the element R in the active material particles were 0.5 mass %, 2.0 mass %, 25 mass % and 28 mass % for the above-stated processing time conditions, respectively. Table 4A shows the list of these samples.

TABLE 4A

| Sample No. | element R | Impregnation time (min.) | Actual contents of element R (mass %) | Oxygen amount (mass %) | Avg. particle diameter (μm) |
|---|---|---|---|---|---|
| 33 | Sn | 30 | 11.8 | 1.1 | 2.9 |
| 34 | Sn | 30 | 11.8 | 1.1 | 2.9 |
| 35 | Sn | 30 | 11.8 | 1.1 | 2.9 |
| 36 | Sn | 30 | 11.8 | 1.1 | 2.9 |
| 37 | Sn | 30 | 11.8 | 1.1 | 2.9 |
| 38 | In | 30 | 9.9 | 0.8 | 3.1 |

TABLE 4A-continued

| Sample No. | element R | Impregnation time (min.) | Actual contents of element R (mass %) | Oxygen amount (mass %) | Avg. particle diameter (μm) |
|---|---|---|---|---|---|
| 39 | In | 30 | 9.9 | 0.8 | 3.1 |
| 40 | In | 30 | 9.9 | 0.8 | 3.1 |
| 41 | In | 30 | 9.9 | 0.8 | 3.1 |
| 42 | In | 30 | 9.9 | 0.8 | 3.1 |
| 43 | Sn | 5 | 0.5 | 0.7 | 2.6 |
| 44 | Sn | 5 | 0.5 | 0.7 | 2.6 |
| 45 | Sn | 5 | 0.5 | 0.7 | 2.6 |
| 46 | Sn | 5 | 0.5 | 0.7 | 2.6 |
| 47 | Sn | 5 | 0.5 | 0.7 | 2.6 |
| 48 | Sn | 8 | 2.0 | 0.9 | 2.7 |
| 49 | Sn | 8 | 2.0 | 0.9 | 2.7 |
| 50 | Sn | 8 | 2.0 | 0.9 | 2.7 |
| 51 | Sn | 8 | 2.0 | 0.9 | 2.7 |
| 52 | Sn | 8 | 2.0 | 0.9 | 2.7 |
| 53 | Sn | 100 | 25 | 1.4 | 3.1 |
| 54 | Sn | 100 | 25 | 1.4 | 3.1 |
| 55 | Sn | 100 | 25 | 1.4 | 3.1 |
| 56 | Sn | 100 | 25 | 1.4 | 3.1 |
| 57 | Sn | 100 | 25 | 1.4 | 3.1 |
| 58 | Sn | 120 | 28 | 1.6 | 3.4 |
| 59 | Sn | 120 | 28 | 1.6 | 3.4 |
| 60 | Sn | 120 | 28 | 1.6 | 3.4 |
| 61 | Sn | 120 | 28 | 1.6 | 3.4 |
| 62 | Sn | 120 | 28 | 1.6 | 3.4 |

Next, using the thus obtained negative electrode active materials of Samples 33 to 62, negative electrodes were manufactured in a similar manner to Comparative Example 1. Subsequently, a heat treatment was conducted to the thus manufactured negative electrodes in a similar manner to Example 1. The temperature of the heat treatment was set at 60° C., 150° C., 200° C., 350° C. or 400° C. The heat treatment was carried out by raising a temperature at a rate of 20° C./minute up to an intended temperature, which then was maintained for 10 hours. The atmosphere of the heat treatment was a mixed gas atmosphere (reducing atmosphere) of Ar gas and $H_2$ gas (5 volume %). The heat treatment conditions for the respective samples are shown in Table 4B.

TABLE 4B

| Sample No. | Temperature (° C.) | Heat treatment atmosphere |
|---|---|---|
| 33 | 60 | Ar + $H_2$ (5%) |
| 34 | 150 | Ar + $H_2$ (5%) |
| 35 | 200 | Ar + $H_2$ (5%) |
| 36 | 350 | Ar + $H_2$ (5%) |
| 37 | 400 | Ar + $H_2$ (5%) |
| 38 | 60 | Ar + $H_2$ (5%) |
| 39 | 150 | Ar + $H_2$ (5%) |
| 40 | 200 | Ar + $H_2$ (5%) |
| 41 | 350 | Ar + $H_2$ (5%) |
| 42 | 400 | Ar + $H_2$ (5%) |
| 43 | 60 | Ar + $H_2$ (5%) |
| 44 | 150 | Ar + $H_2$ (5%) |
| 45 | 200 | Ar + $H_2$ (5%) |
| 46 | 350 | Ar + $H_2$ (5%) |
| 47 | 400 | Ar + $H_2$ (5%) |
| 48 | 60 | Ar + $H_2$ (5%) |
| 49 | 150 | Ar + $H_2$ (5%) |
| 50 | 200 | Ar + $H_2$ (5%) |
| 51 | 350 | Ar + $H_2$ (5%) |
| 52 | 400 | Ar + $H_2$ (5%) |
| 53 | 60 | Ar + $H_2$ (5%) |
| 54 | 150 | Ar + $H_2$ (5%) |
| 55 | 200 | Ar + $H_2$ (5%) |
| 56 | 350 | Ar + $H_2$ (5%) |
| 57 | 400 | Ar + $H_2$ (5%) |
| 58 | 60 | Ar + $H_2$ (5%) |
| 59 | 150 | Ar + $H_2$ (5%) |
| 60 | 200 | Ar + $H_2$ (5%) |
| 61 | 350 | Ar + $H_2$ (5%) |
| 62 | 400 | Ar + $H_2$ (5%) |

Using the thus prepared negative electrodes, batteries were manufactured in a similar manner to Comparative Example 1, and their characteristics were evaluated. The battery characteristics were evaluated in a similar manner to Comparative Example 1. Table 4C shows the results.

TABLE 4C

| Sample No. | Discharging capacity (mAh) | Capacity maintaining rate (%) | Expansion rate (%) |
|---|---|---|---|
| 33 | 70 | 50 | 145 |
| 34 | 68 | 90 | 113 |
| 35 | 66 | 92 | 110 |
| 36 | 61 | 84 | 106 |
| 37 | 56 | 66 | 105 |
| 38 | 69 | 49 | 141 |
| 39 | 69 | 83 | 129 |
| 40 | 65 | 91 | 113 |
| 41 | 62 | 79 | 110 |
| 42 | 57 | 61 | 109 |
| 43 | 64 | 48 | 139 |
| 44 | 67 | 51 | 128 |
| 45 | 65 | 53 | 127 |
| 46 | 64 | 49 | 128 |
| 47 | 57 | 44 | 127 |
| 48 | 65 | 51 | 141 |
| 49 | 68 | 88 | 115 |
| 50 | 66 | 90 | 110 |
| 51 | 64 | 84 | 109 |
| 52 | 56 | 57 | 112 |
| 53 | 73 | 35 | 183 |
| 54 | 70 | 86 | 116 |
| 55 | 69 | 90 | 111 |
| 56 | 66 | 82 | 112 |
| 57 | 65 | 52 | 124 |
| 58 | 75 | 25 | 193 |
| 59 | 71 | 37 | 159 |
| 60 | 65 | 40 | 154 |
| 61 | 61 | 31 | 150 |
| 62 | 52 | 26 | 143 |

As shown in Table 4C, all of the samples had larger discharging capacities than Sample 101 as the comparative example. Among them, Samples 34 to 42, Samples 49 to 52 and Samples 54 to 56 showed excellent results for all of their discharging capacities, capacity maintaining rates and expansion rates. As for Samples 43 to 47, there is a possibility that the amount of attached Sn was not sufficient. As for Samples 58 to 62, there is a possibility that the amount of attached Sn was too much.

Similar results could be obtained also in the case where sputtering, vacuum evaporation, CVD technique or the like was used for attaching Sn to the surfaces of the active material particles instead of plating. Particularly, the heat treatment temperature at 150° C. led to excellent discharging capacities and capacity maintaining rates and small expansion rates. Further, in the case where Sn was attached to the surfaces of active material particles using sputtering, vacuum evaporation, CVD technique or the like, the actually attached amount of Sn was in the range of about 6 mass % to 10 mass % of the mass of the active material. Further, it was confirmed that all of the element Sn was present in the range from the surface of the active material to the depth of 0.1D, where D represents the particle diameter of the active material.

Example 4

Firstly, negative electrode active materials were prepared, which were used in Comparative Example Samples 106, 108 and 111 and whose compositions were Si—Cu, Si—Ti and Si—Ni. Table 5A shows the list of these samples.

TABLE 5A

| Sample No. | Composition of negative electrode active material | Element M (mass %) | Si (mass %) |
|---|---|---|---|
| 63 | Si—Cu | 42 | 58 |
| 64 | Si—Cu | 42 | 58 |
| 65 | Si—Cu | 42 | 58 |
| 66 | Si—Ti | 37 | 63 |
| 67 | Si—Ti | 37 | 63 |
| 68 | Si—Ti | 37 | 63 |
| 69 | Si—Ni | 46 | 54 |
| 70 | Si—Ni | 46 | 54 |
| 71 | Si—Ni | 46 | 54 |

Using the thus prepared negative electrode active materials as Samples 63 to 72, negative electrodes were manufactured in a similar manner to Comparative Example 1 (however, the processing into a circular shape was not performed). Next, for each of the thus manufactured negative electrodes, a face from which copper foil as a collector was exposed (a face of a collector on which an active material was not applied) was protected with masking tape, and then the negative electrode was plated with the element R (Sn, In and Pb).

Sn-plating was performed by impregnating the negative electrode with an electroless plating solution of Sn (pH=1.8, plating temperature: 40° C.) for 30 minutes. In-plating was performed by impregnating the negative electrode with an electroless plating solution of In (pH=12, plating temperature: 25° C.) for 30 minutes. Pb-plating was performed by impregnating the negative electrode with an electroless plating solution of Pb (pH=1.5, plating temperature: 45° C.) for 15 minutes. Before conducting the electroless plating of Sn, In and Pb, the surface of the active material of the negative electrode was activated (application of Pd catalyst) as a pretreatment, and primary Cu coating was formed (by electroless plating).

Next, the negative electrode subjected to plating was washed by impregnating it with distilled water for 10 minutes, which was repeated three times. Finally, the negative electrode was dried in an Ar atmosphere at 60° C. for 10.5 hours.

A part of the active material layer of the thus manufactured negative electrode was peeled off, and the composition ratio of the active material was quantified by ICP spectrochemical analysis. As a result, as shown in Table 5B, the contents of the element R in the active material particles in the respective samples were in the range from 7.4 mass % to 12.4 mass %.

Further, when cross sections of the active material layers were EPMA analyzed, it was confirmed that all of the element R was present in the range from the surface of the active material particle to the depth of 0.1D, where D represents the particle diameter of the active material particle. Moreover, it was confirmed that the element R was deposited so as to couple the active material particles together.

TABLE 5B

| Sample No. | Element R | Actual contents of element R (mass %) | Avg. particle diameter (μm) |
|---|---|---|---|
| 63 | Sn | 7.4 | 2.1 |
| 64 | In | 8.6 | 1.9 |
| 65 | Pb | 10.1 | 2 |
| 66 | Sn | 8.3 | 2.7 |
| 67 | In | 9.1 | 2.8 |
| 68 | Pb | 11.9 | 2.7 |
| 69 | Sn | 8.6 | 3 |
| 70 | In | 9.7 | 2.9 |
| 71 | Pb | 12.4 | 3.1 |

Next, the negative electrodes prepared as described above were cut out into circles with a diameter of 12.5 mm, and a heat treatment was applied thereto in a similar manner to Example 1. Temperatures of the heat treatment were set at 150° C., 200° C. and 350° C. for Sn, In and Pb as the elements R, respectively. The heat treatment was carried out by raising a temperature up to a temperature intended, which then was maintained for 10 hours. The atmosphere of the heat treatment was a mixed gas atmosphere (reducing atmosphere) of Ar gas and $H_2$ gas (5 volume %).

Next, using the respective negative electrodes subjected to heat treatment, batteries were manufactured in a similar manner to Comparative Example 1 and their characteristics were evaluated. The battery characteristics were evaluated in a similar manner to Comparative Example 1. Table 5C shows the results.

TABLE 5C

| Sample No. | Discharging capacity (mAh) | Capacity maintaining rate (%) | Expansion rate (%) |
|---|---|---|---|
| 63 | 68 | 87 | 113 |
| 64 | 67 | 85 | 115 |
| 65 | 68 | 84 | 116 |
| 66 | 66 | 91 | 112 |
| 67 | 67 | 89 | 114 |
| 68 | 65 | 86 | 113 |
| 69 | 63 | 86 | 118 |
| 70 | 64 | 84 | 120 |
| 71 | 64 | 84 | 119 |

As shown in Table 5C, all of the samples had larger discharging capacities than Sample 101 as the comparative example. Further, Samples 63 to 65, Samples 66 to 68 and Samples 69 to 71 showed improved capacity maintaining rates and expansion rates as compared with Samples 106, 108 and 111 having the same compositions, respectively.

Example 5

Firstly, a negative electrode active material used for Sample 1 as the example was prepared. As shown in Table 2A, this active material particle contained Si, Ti and Sn as the element R, and the content of Sn in the active material particles was 7.2 mass %.

Next, using the thus prepared active material, negative electrodes were manufactured in a similar manner to Comparative Example 1. Herein, a plurality of types of collectors different in shape, composition and the like were prepared, and negative electrodes were manufactured using the respective collectors. Table 6A shows the list of these samples.

TABLE 6A

| Sample No. | Composition of collector | Shape of collector | States of collector |
|---|---|---|---|
| 72 | Cu | Rolled foil | Thickness 14 μm<br>Surface roughness Ra 0.02 μm |
| 73 | Cu | Electrolytic foil | Thickness 11 μm<br>Surface roughness Ra 0.8 μm |
| 74 | Cu | Electrolytic foil | Thickness 15 μm<br>Surface roughness Ra 1.2 μm |
| 75 | Cu | Foil with protrusions | Thickness of flat part 10 μm<br>Avg. length of protrusions 7 μm<br>Avg. thickness of protrusions 0.5 μm |
| 76 | Cu | Porous | Thickness 45 μm<br>Avg. pore diameter 3.5 μm<br>Thickness of porous part 10 μm |
| 77 | Cu | Foam | Thickness 60 μm<br>Avg. pore diameter 4.2 μm<br>Avg. thickness of Cu in mesh part 0.1 μm |
| 79 | $Cu_{80}Sn_{20}$ | Alloy foil | Thickness 14 μm<br>Surface roughness Ra 0.8 μm |
| 80 | Ni | Foam | Thickness 60 μm<br>Avg. pore diameter 3.8 μm<br>Avg. thickness of Ni in mesh part 0.1 μm |

As the collectors of Samples 72 to 77, Cu rolled foil (thickness: 14 μm, Cu content: 99.9 mass % or more, surface roughness Ra: 0.02 μm); Cu electrolytic foil (thickness: 11 μm, Cu content: 99.99 mass % or more, surface roughness Ra: 0.8 μm); Cu electrolytic foil (thickness: 15 μm, Cu content: 99.99 mass % or more, surface roughness Ra: 1.2 μm); Cu foil with protrusions (thickness of flat part 10 μm, Cu content: 99.9 mass % or more, average length of protrusions: 7 μm, average thickness of protrusions: 0.5 μm); porous collector obtained by electrolysis of Cu board (thickness: 45 μm, Cu content: 99.99 mass % or more) so that the surface becomes porous (average pore diameter: 3.5 μm, thickness of porous part: 10 μm); and Cu foam mesh member (Cu content: 99.9 mass % or more, average pore diameter: 4.2 μm, thickness: 60 μm, average thickness of Cu in mesh part: 0.1 μm) were used respectively.

Further, for comparison, as a collector of Sample 79, Cu—Sn alloy foil made of 80 mass % of Cu and 20 mass % of Sn (thickness: 14 μm, surface roughness Ra: 0.8 μm) was used. As a collector of Sample 80, a Ni foam mesh member (average pore diameter: 3.8 μm, thickness: 60 μm, average thickness of Ni in mesh part: 0.1 μm) was used.

Using the thus prepared collectors and negative electrode active materials, negative electrodes were manufactured in a similar manner to Comparative Example 1. At this time, in the samples using the foam mesh member of Cu and the foam mesh member of Ni, slurry was applied to the foam members so that the amount of active materials per unit area became equal to that of the other samples using metal foil, which were further rolled to be 40 μm in thickness, whereby the negative electrodes were manufactured.

Next, the thus manufactured negative electrodes were heat-treated in the exactly same manner as Example 1 in a mixed gas atmosphere (reducing atmosphere) of Ar gas and $H_2$ gas (5 volume %) at 150° C. for 10.5 hours.

Using the thus prepared negative electrodes, batteries were manufactured in a similar manner to Comparative Example 1, and their characteristics were evaluated. The battery characteristics were evaluated in a similar manner to Comparative Example 1. Table 6B shows the results.

TABLE 6B

| Sample No. | Discharging capacity (mAh) | Capacity maintaining rate (%) | Expansion rate (%) |
|---|---|---|---|
| 72 | 66 | 87 | 113 |
| 73 | 65 | 89 | 110 |
| 74 | 65 | 89 | 113 |
| 75 | 66 | 93 | 112 |
| 76 | 65 | 95 | 109 |
| 77 | 66 | 94 | 106 |
| 79 | 75 | 45 | 160 |
| 80 | 73 | 35 | 147 |

As shown in Table 6B, in the case of using the collectors containing of 95 mass % or more of Cu, their capacity maintaining rates and expansion rates were significantly favorable. On the other hand, the collectors used for Samples 79 and 80 had larger expansion rates, and degraded collection capabilities and capacity maintaining rates. From these results, when the element R is present in a negative electrode and a collector contains Cu, the effects of the present invention can be obtained more.

Comparative Example 2

Firstly, negative electrode active materials were prepared, which were used for Samples 1, 29 to 32 as examples. Next, using the thus prepared active materials, negative electrodes were manufactured in a similar manner to Comparative Example 1.

Next, the thus manufactured negative electrodes were heat-treated at 150° C. for 10.5 hours. The heat treatment was in an atmosphere of a mixed gas of Ar gas and $O_2$ gas (10 volume %) or in the air ($N_2$: about 80 volume %, $O_2$: about 20 volume %). Next, using the negative electrodes subjected to heat treatment, batteries were manufactured in a similar manner to Comparative Example 1, and their characteristics were evaluated. The battery characteristics were evaluated in a similar manner to Comparative Example 1. Table 7A shows the list of samples and Table 7B shows the evaluation results of the battery characteristics.

TABLE 7A

| Sample No. | Composition of negative electrode active material | Heat treatment atmosphere | Oxygen amount after heat treatment (mass %) |
|---|---|---|---|
| 81 | Si—Ti | Ar + $O_2$ (10%) | 3.5 |
| 82 | Si—Cu | Ar + $O_2$ (10%) | 3.4 |
| 83 | Si—Ni | Ar + $O_2$ (10%) | 3.7 |
| 84 | Si—Co | Ar + $O_2$ (10%) | 4.1 |
| 85 | Si—Fe | Ar + $O_2$ (10%) | 4.3 |
| 86 | Si—Ti | Air($N_2$ 80%-$O_2$ 20%) | 5.9 |
| 87 | Si—Cu | Air($N_2$ 80%-$O_2$ 20%) | 6.3 |
| 88 | Si—Ni | Air($N_2$ 80%-$O_2$ 20%) | 5.7 |
| 89 | Si—Co | Air($N_2$ 80%-$O_2$ 20%) | 5.9 |
| 90 | Si—Fe | Air($N_2$ 80%-$O_2$ 20%) | 7.1 |

TABLE 7B

| Sample No. | Discharging capacity (mAh) | Capacity maintaining rate (%) | Expansion rate (%) |
|---|---|---|---|
| 81 | 64 | 49 | 142 |
| 82 | 64 | 46 | 150 |
| 83 | 62 | 48 | 139 |
| 84 | 61 | 51 | 144 |
| 85 | 59 | 43 | 141 |
| 86 | 60 | 37 | 152 |
| 87 | 61 | 34 | 156 |
| 88 | 58 | 39 | 149 |
| 89 | 57 | 34 | 143 |
| 90 | 55 | 36 | 156 |

As shown in Table 7B, in the case of using negative electrodes heat-treated in an atmosphere containing oxygen, their capacity maintaining rates were degraded significantly to about 50% or less. In order to investigate the cause of this, using the negative electrodes manufactured in the present example, Auger electron spectroscopy was conducted with respect to the surfaces of the electrodes and cross sections of the electrodes that were not subjected to the evaluation of battery characteristics. As a result, oxide coating was generated especially on the surface of the electrodes and on the surface of the active material particles, and the thickness of the coating was as large as about several hundred nanometers. Presumably, since the oxide coating was generated excessively, electronic conductivity of the electrode itself was degraded and thus the capacity maintaining rate was degraded.

Example 6

Firstly, a negative electrode active material was prepared, which was used for Comparative Example 108 (composition of Si—Ti). Further, as an additive of the element R added to the negative electrode active material and to the slurries at the time of manufacturing a negative electrode, Sn powder (purity: 99.9%, average particle diameter: 2 μm), In powder (purity: 99.9%, average particle diameter: 10 μm) and Pb powder (purity 99.9%, average particle diameter: 5 μm) were prepared. Next, negative electrode slurries were manufactured using pure water at a mixing ratio of active material powder: additive:binder=90:5:5 (mass ratio), and negative electrodes were manufactured in a similar manner to Comparative Example 1.

Next, the thus manufactured negative electrodes were heat-treated at predetermined temperatures shown in Table 8A. The temperature raising rate was set at 20° C./minute for all samples, and the heat treatment temperatures were maintained for 10 hours, followed by natural cooling to a room temperature. The atmosphere of heat treatment contained Ar gas only for all samples.

Further, a sample with a conductive agent added also was examined. At this time, as the conductive agent, Cu powder (purity: 99.9%, average particle diameter: 1 μm), Ni powder (purity: 99.9%, average particle diameter: 2 μm) and Ti powder (purity: 99.9%, average particle diameter: 2 μm) were used. The conductive agent was mixed during the manufacturing of the negative electrode slurry, and the respective mixing ratio was set at active material: additive:conductive agent:binder=85:5:5:5 (mass ratio). The element R in the samples with the conductive agent added was Sn.

Table 8A shows the list of samples.

TABLE 8A

| Sample No. | Type of additive | Type of conductive agent | Heat treatment temperature |
|---|---|---|---|
| 90 | Sn | — | 150 |
| 91 | In | — | 200 |
| 92 | Pb | — | 300 |
| 93 | Sn | Cu | 150 |
| 94 | Sn | Ni | 150 |
| 95 | Sn | Ti | 150 |

When the negative electrodes subjected to heat treatment were analyzed by X-ray diffraction, X-ray diffraction peaks showing an intermetallic compound of Cu as the collector and the element R were confirmed. Further, as a result of ESCA analysis, a state of a junction of active material particles via the element R was confirmed in the vicinity of an interface between the active material particles.

Using the thus prepared negative electrodes, batteries were manufactured in a similar manner to Comparative Example 1, and their characteristics were evaluated. The battery characteristics were evaluated in a similar manner to Comparative Example 1. Table 8B shows the results.

TABLE 8B

| Sample No. | Discharging capacity (mAh) | Capacity maintaining rate (%) | Expansion rate (%) |
|---|---|---|---|
| 90 | 66 | 88 | 116 |
| 91 | 65 | 83 | 114 |
| 92 | 66 | 86 | 113 |
| 93 | 63 | 96 | 117 |
| 94 | 62 | 93 | 116 |
| 95 | 63 | 93 | 115 |

As shown in Table 8B, all of the samples had larger discharging capacities than Sample 101 as the comparative example. Further, all of the samples showed improved capacity maintaining rates and expansion rates as compared with Sample 108 the same composition. It was found that a transition metal element was preferable as the conductive agent, and above all the use of Cu led to significantly excellent effects.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

As described above, according to the present invention, a nonaqueous electrolyte secondary battery with excellent charging/discharging cycle characteristics can be provided, more specifically a nonaqueous electrolyte secondary battery in which deterioration of the conductivity of a negative electrode due to charging/discharging cycle is suppressed and a method for manufacturing the same can be provided.

The invention claimed is:

1. A nonaqueous electrolyte secondary battery comprising: a positive electrode and a negative electrode that are capable of reversibly absorbing and desorbing Li ions; and a nonaqueous electrolyte having lithium ion conductivity, wherein the negative electrode comprises a collector and active material particles that are disposed on a surface of the collector, the collector comprises Cu in an amount of 95 mass % or more, the active material particles comprise Si and at least one element R selected from the group consisting of Sn, In, Ga, Pb and Bi, metallic bond including the element R is formed between a part of the active material particles and the collector, and 80 atomic % or more of the element R exists in a range from a surface of the active materiel particle to a depth of 0.1D, where D denotes particle diameter of the active materiel particle.

2. The nonaqueous electrolyte secondary battery according to claim 1, wherein the active material particles further comprise a transition metal element M, and the element M comprises at least one element selected from the group consisting of Ti, Cu, Ni, Co and Fe.

3. The nonaqueous electrolyte secondary battery according to claim 2, wherein an amount of the element R included in the active material particles is in a range from 2 mass parts to 25 mass parts, inclusive, relative to a total 100 mass parts of Si and the element M included in the active material particles.

4. The nonaqueous electrolyte secondary battery according to claim 2, wherein the active material particles comprise: a first phase made of an intermetallic compound represented by a chemical composition formula of $MSi_2$; and a second phase made of amorphous Si.

5. The nonaqueous electrolyte secondary battery according to claim 2, wherein the element M is Ti.

6. The nonaqueous electrolyte secondary battery according to claim 4, wherein the first phase comprises crystallites having an average diameter of 50 nm or less.

7. The nonaqueous electrolyte secondary battery according to claim 4, wherein the second phase comprises crystallites having an average diameter of 50 nm or less.

8. The nonaquecus electrolyte secondary battery according to claim 1, wherein the negative electrode further comprises a conductive agent including a transition metal element L, and the element L comprises at least one element selected from the group consisting of Cu, Ni, and Ti.

9. The nonaqueous electrolyte secondary battery according to claim 8, wherein the element L is Cu.

10. The nonaqueous electrolyte secondary battery according to claim 1, wherein the metallic bond comprises a solid solution of Cu and the element R.

11. The nonaqueous electrolyte secondary battery according to claim 1, wherein a region where the metallic bond is formed between the active material particles and the collector exhibits non-reactivity with lithium.

12. The nonaqueous electrolyte secondary battery according to claim 1, wherein the collector has at least one shape selected from the group consisting of foil, porous and foam.

13. The nonaqueous electrolyte secondary battery according to claim 1, wherein an oxygen content of the active material particles is 2 wt % or less.

14. A method for manufacturing a nonaqueous electrolyte secondary battery comprising a positive electrode and a negative electrode that are capable of reversibly absorbing and desorbing Li ions; and a nonaqueous electrolyte having lithium ion conductivity, the method comprising the steps of:

(i) forming a first sheet by applying a slurry to a surface of a collector comprising Cu in the amount of 95 mass % or more, followed by drying, the slurry comprising active material particles comprising Si and at least one element R selected from the group consisting of Sn, In, Ga, Pb and Bi; and (ii) forming the negative electrode so that a metallic bond including the element R is formed between a part of the active material particles and the collector and 80 atomic % or more of the element R exists in a range from a surface of the active material particle to a depth of 0.1D where D denotes a particle diameter of the active material particle by heat-treating the first sheet at a temperature ranging from 80° C. to 350° C. in a non-oxidizing atmosphere.

15. The method for manufacturing a nonaqueous electrolyte secondary battery according to claim 14, wherein the active material particles further comprise a transition metal element M, and the element M comprises at least one element selected from the group consisting of Ti, Cu, Ni Co and Fe.

16. The method for manufacturing a nonaquecus electrolyte secondary battery according to claim 15, wherein the element M is Ti.

17. The method for manufacturing a nonaqueous electrolyte secondary battery according to claim 14, wherein in the step (i) the slurry applied to the surface of the collector further comprises a conductive agent comprising a transition metal element L, and the element L comprises at least one element selected from the group consisting of Cu, Ni, and Ti.

18. The method for manufacturing a nonaquecus electrolyte secondary battery according to claim 17, wherein the element L is Cu.

19. A method for manufacturing a nonaqueous electrolyte secondary battery comprising a positive electrode and a negative electrode that are capable of reversibly absorbing and desorbing Li ions; and a nonaqueous electrolyte having lithium ion conductivity, the method comprising the steps of:

(I) forming a first sheet by applying a slurry including active material particles comprising Si to a surface of a collector comprising Cu in an amount of 95 mass % or more, followed by drying;

(II) forming a second sheet by forming a film comprising at least one element R selected from the group consisting of Sn, In, Ga, Pb and Bi on surfaces of the active material particles; and (III) forming the negative electrode so that a metallic bond including the element R is formed between a part of the active material particles and the collector by heat-treating the second sheet at a temperature ranging from 80° C. to 350° C. in a non-oxidizing atmosphere.

20. The method for manufacturing a nonaqueous electrolyte secondary battery according to claim 19, wherein the active material particles further comprise a transition metal element M, and the element M comprises at least one element selected from the group consisting of Ti, Cu, Ni, Co and Fe.

21. The method for manufacturing a nonaqueous electrolyte secondary battery according to claim 20, wherein the element M is Ti.

22. The method for manufacturing a nonaqueous electrolyte secondary battery according to claim 19, wherein in the step (I) the slurry applied to the surface of the collector further comprises a conductive agent comprising a transition metal element L, and the element L comprises at least one element selected from the group consisting of Cu, Ni, and Ti.

23. The method for manufacturing a nonaqueous electrolyte secondary battery according to claim 22, wherein the element L is Cu.

24. The method for manufacturing a nonaqueous electrolyte secondary battery according to claim 19, wherein in the step (II) the film comprising at least one element R is formed by at least one method selected from the group consisting of plating and chemical vapor deposition (CVD).

* * * * *

UNITED STATES PATENT AND TRADEMARK OFFICE
CERTIFICATE OF CORRECTION

PATENT NO. : 7,597,997 B2 Page 1 of 1
APPLICATION NO. : 10/545760
DATED : October 6, 2009
INVENTOR(S) : Sato et al.

It is certified that error appears in the above-identified patent and that said Letters Patent is hereby corrected as shown below:

Column 37, line 16: "materiel" should read --material--.
Column 37, line 41: "nonaquecus" should read --nonaqueous--.

Signed and Sealed this

Twenty-fourth Day of August, 2010

David J. Kappos
*Director of the United States Patent and Trademark Office*